US011805524B2

(12) United States Patent
Liou

(10) Patent No.: US 11,805,524 B2
(45) Date of Patent: Oct. 31, 2023

(54) APPLYING SPATIAL RELATIONS TO UL TRANSMISSION OCCASIONS

(71) Applicant: FG Innovation Company Limited, Tuen Mun (HK)

(72) Inventor: Jia-Hong Liou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 163 days.

(21) Appl. No.: 17/397,116

(22) Filed: Aug. 9, 2021

(65) Prior Publication Data

US 2022/0046635 A1 Feb. 10, 2022

Related U.S. Application Data

(60) Provisional application No. 63/062,757, filed on Aug. 7, 2020.

(51) Int. Cl.
*H04W 72/10* (2009.01)
*H04W 72/21* (2023.01)
*H04W 72/23* (2023.01)

(52) U.S. Cl.
CPC ........... *H04W 72/21* (2023.01); *H04W 72/23* (2023.01)

(58) Field of Classification Search
CPC .............................. H04W 72/21; H04W 72/23
See application file for complete search history.

(56) References Cited

U.S. PATENT DOCUMENTS

2022/0361202 A1* 11/2022 Yi ........................ H04W 24/10

FOREIGN PATENT DOCUMENTS

| CN | 111278120 A | 6/2020 |
| CN | 111278128 A | 6/2020 |
| CN | 111294177 A | 6/2020 |
| WO | 2019/200313 A1 | 10/2019 |

OTHER PUBLICATIONS

3GPP TS 38.300, "3rd Generation Partnership Project; Technical Specification Group Radio Access Network; NR; NR and NG-RAN Overall Description; Stage 2 (Release 16)", V16.2.0 (Jul. 2020).

(Continued)

*Primary Examiner* — Ronald B Abelson
(74) *Attorney, Agent, or Firm* — ScienBiziP, P.C.

(57) ABSTRACT

Some present implementations provide a method for indicating multiple spatial relations for uplink (UL) transmissions by a user equipment (UE). The method may receive a first configuration for configuring one or more physical uplink control channel (PUCCH) resources. The method may further receive a second configuration for configuring a plurality of spatial relations. The method may also receive a signal that indicates at least one of a first mode or a second mode. The method may further receive downlink control information (DCI) indicating a PUCCH resource from the one or more PUCCH resources, where first and second spatial relations are activated for the PUCCH resource. The method may derive a plurality of PUCCH transmission occasions associated with the indicated PUCCH resource. A same uplink control information (UCI) content may be transmitted on each of the plurality of PUCCH transmission occasions by applying the spatial relations based on the indicated mode.

20 Claims, 26 Drawing Sheets

(56) References Cited

OTHER PUBLICATIONS

3GPP TS 38.306, "3rd Generation Partnership Project; Technical Specification Group Radio Access Network; NR User Equipment (UE) radio access capabilities (Release 16)", V16.1.0 (Jul. 2020).
3GPP TS 38.321, "3rd Generation Partnership Project; Technical Specification Group Radio Access Network; NR Medium Access Control (MAC) protocol specification (Release 16)", V16.1.0 (Jul. 2020).
3GPP TS 38.212, "3rd Generation Partnership Project; Technical Specification Group Radio Access Network; NR Multiplexing and channel coding (Release 16)", V16.2.0 (Jun. 2020).
3GPP TS 38.211, "3rd Generation Partnership Project; Technical Specification Group Radio Access Network; NR Physical channels and modulation (Release 16)", V16.2 0 (Jun. 2020).
3GPP TS 38.213, "3rd Generation Partnership Project; Technical Specification Group Radio Access Network; NR Physical layer procedures for control (Release 16)", V16.2.0 (Jun. 2020).
3GPP TS 38.214, "3rd Generation Partnership Project; Technical Specification Group Radio Access Network; NR Physical layer procedures for data (Release 16)", V16.2.0 (Jun. 2020).
3GPP TS 38.331, "3rd Generation Partnership Project; Technical Specification Group Radio Access Network; NR Radio Resource Control (RRC) protocol specification (Release 16)", V16.1.0 (Jul. 2020).
Samsung, "New WID: Further enhancements on MIMO for NR", 3GPP TSG RAN Meeting #86 Sitges, Spain, Dec. 9-12, 2019, RP-193133.
3GPP TS 38.202, "3rd Generation Partnership Project; Technical Specification Group Radio Access Network; NR Services provided by the physical layer (Release 16)", V16.2.0 (Sep. 2020).
3GPP TS 38.305, "3rd Generation Partnership Project; Technical Specification Group Radio Access Network; NG Radio Access Network (NG-RAN); Stage 2 functional specification of User Equipment (UE) positioning in NG-RAN (Release 16)", V16.5.0 (Jun. 2021).
3GPP TS 38.331, "3rd Generation Partnership Project; Technical Specification Group Radio Access Network; NR Radio Resource Control (RRC) protocol specification (Release 16)", V16.2.0 (Sep. 2020).
3GPP TS 38.331, "3rd Generation Partnership Project; Technical Specification Group Radio Access Network; NR Radio Resource Control (RRC) protocol specification (Release 16)", V16.6.0 (Sep. 2021).
3GPP TS 38.473, "3rd Generation Partnership Project; Technical Specification Group Radio Access Network; NG-RAN; F1 application protocol (F1AP) (Release 16)", V16.6.0 (Jul. 2021).
3GPP TS 38.473, "3rd Generation Partnership Project; Technical Specification Group Radio Access Network; NG-RAN; F1 application protocol (F1AP) (Release 16)", V16.9.0 (Apr. 2022).
3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN) Overall description; Stage 2 (Release 16)", V16.6.0 (Jun. 2021).
CATT, "Discussion on enhancements on multi-TRP/panel for PDCCH, PUCCH and PUSCH", R1-2007825, 3GPP TSG RAN WG1 Meeting #103-e, e-Meeting, Oct. 26-Nov. 13, 2020.
NTT Docomo, Inc., "Discussion on multi-beam enhancement", R1-1906225, 3GPP TSG RAN WG1 #97, Reno, USA, May 13-17, 2019.

* cited by examiner

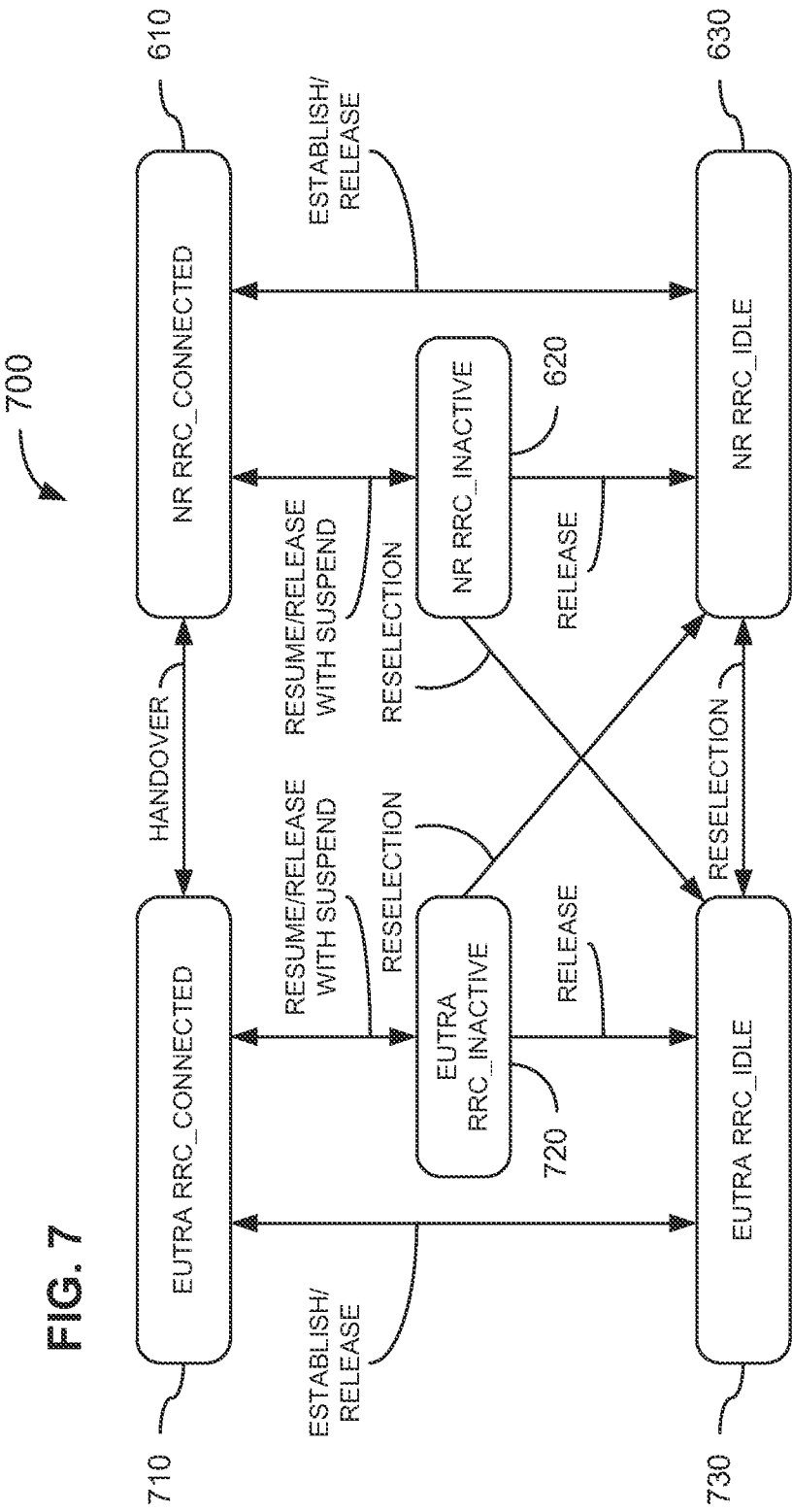

FIG. 8

```
-- ASN1START
-- TAG-BWP-UPLINKDEDICATED-START

BWP-UplinkDedicated ::=            SEQUENCE {
    pucch-Config                       SetupRelease { PUCCH-Config }        OPTIONAL,   -- Need M
    pusch-Config                       SetupRelease { PUSCH-Config }        OPTIONAL,   -- Need M
    configuredGrantConfig              SetupRelease { ConfiguredGrantConfig } OPTIONAL, -- Need M
    srs-Config                         SetupRelease { SRS-Config }          OPTIONAL,   -- Need M
    beamFailureRecoveryConfig          SetupRelease { BeamFailureRecoveryConfig } OPTIONAL, -- Cond
SpCellOnly
    ...,
    [[
    sl-PUCCH-Config-r16                SetupRelease { PUCCH-Config }        OPTIONAL,   -- Need M
    cp-ExtensionC2-r16                 INTEGER (1..28)                      OPTIONAL,   -- Need R
    cp-ExtensionC3-r16                 INTEGER (1..28)                      OPTIONAL,   -- Need R
    useInterlacePUCCH-PUSCH-r16        ENUMERATED {enabled}                 OPTIONAL,   -- Need M
    pucch-ConfigurationList-r16        SetupRelease { PUCCH-ConfigurationList-r16 } OPTIONAL, -- Need M
    lbt-FailureRecoveryConfig-r16      SetupRelease { LBT-FailureRecoveryConfig-r16 } OPTIONAL, -- Need M
    configuredGrantConfigToAddModList-r16    ConfiguredGrantConfigToAddModList-r16    OPTIONAL, -- Need N
    configuredGrantConfigToReleaseList-r16   ConfiguredGrantConfigToReleaseList-r16   OPTIONAL, -- Need N
    configuredGrantConfigType2DeactivationStateList-r16  ConfiguredGrantConfigType2DeactivationStateList-r16  OPTIONAL, -- Need R
    ]]
};

ConfiguredGrantConfigToAddModList-r16       ::= SEQUENCE (SIZE (1..maxNrofConfiguredGrantConfig-r16)) OF ConfiguredGrantConfig ConfiguredGrantConfigToReleaseList-r16      ::= SEQUENCE (SIZE (1..maxNrofConfiguredGrantConfig-r16)) OF ConfiguredGrantConfigIndex-r16

ConfiguredGrantConfigType2DeactivationState-r16 ::= SEQUENCE (SIZE (1..maxNrofConfiguredGrantConfig-r16)) OF ConfiguredGrantConfigIndex-r16

ConfiguredGrantConfigType2DeactivationStateList-r16 ::=
    SEQUENCE (SIZE (1..maxNrofCG-Type2DeactivationState)) OF ConfiguredGrantConfigType2DeactivationState

-- TAG-BWP-UPLINKDEDICATED-STOP
-- ASN1STOP
```

```
-- ASN1START
-- TAG-CONTROLRESOURCESET-START

ControlResourceSet ::=        SEQUENCE {
    controlResourceSetId          ControlResourceSetId,
    frequencyDomainResources      BIT STRING (SIZE (45)),
    duration                      INTEGER (1..maxCoReSetDuration),
    cce-REG-MappingType           CHOICE {
        interleaved                   SEQUENCE {
            reg-BundleSize                ENUMERATED {n2, n3, n6},
            interleaverSize               ENUMERATED {n2, n3, n6},
            shiftIndex                    INTEGER(0..maxNrofPhysicalResourceBlocks-1)    OPTIONAL  -- Need S
        },
        nonInterleaved                NULL
    },
    precoderGranularity           ENUMERATED {sameAsREG-bundle, allContiguousRBs},
    tci-StatesPDCCH-ToAddList     SEQUENCE(SIZE (1..maxNrofTCI-StatesPDCCH)) OF TCI-StateId    OPTIONAL,  -- Cond NotSIB1-initialBWP
    tci-StatesPDCCH-ToReleaseList SEQUENCE(SIZE (1..maxNrofTCI-StatesPDCCH)) OF TCI-StateId    OPTIONAL,  -- Cond NotSIB1-initialBWP
    tci-PresentInDCI              ENUMERATED {enabled}                                         OPTIONAL,  -- Need S
    pdcch-DMRS-ScramblingID       INTEGER (0..65535)                                           OPTIONAL,  -- Need S
    ...,
    [[
    rb-Offset-r16                 INTEGER (0..5)                                               OPTIONAL,  -- Need S
    tci-PresentForDCI-Format1-2-r16  INTEGER (1..3)                                            OPTIONAL,  -- Need S
    coresetPoolIndex-r16          INTEGER (0..1)                                               OPTIONAL,  -- Need S
    controlResourceSetId-v1610    ControlResourceSetId-v1610                                   OPTIONAL   -- Need S
    ]]
}

-- TAG-CONTROLRESOURCESET-STOP
-- ASN1STOP
```

```
-- ASN1START
-- TAG-PUCCH-CONFIG-START
PUCCH-Config ::=                    SEQUENCE {
    resourceSetToAddModList             SEQUENCE (SIZE (1..maxNrofPUCCH-ResourceSets)) OF PUCCH-ResourceSet    OPTIONAL,   -- Need N
    resourceSetToReleaseList            SEQUENCE (SIZE (1..maxNrofPUCCH-ResourceSets)) OF PUCCH-ResourceSetId  OPTIONAL,   -- Need N
    resourceToAddModList                SEQUENCE (SIZE (1..maxNrofPUCCH-Resources)) OF PUCCH-Resource          OPTIONAL,   -- Need N
    resourceToReleaseList               SEQUENCE (SIZE (1..maxNrofPUCCH-Resources)) OF PUCCH-ResourceId        OPTIONAL,   -- Need N
    format1                             SetupRelease { PUCCH-FormatConfig }                                    OPTIONAL,   -- Need M
    format2                             SetupRelease { PUCCH-FormatConfig }                                    OPTIONAL,   -- Need M
    format3                             SetupRelease { PUCCH-FormatConfig }                                    OPTIONAL,   -- Need M
    format4                             SetupRelease { PUCCH-FormatConfig }                                    OPTIONAL,   -- Need M
    schedulingRequestResourceToAddModList      SEQUENCE (SIZE (1..maxNrofSR-Resources)) OF SchedulingRequestResourceConfig  OPTIONAL,  -- Need N
    schedulingRequestResourceToReleaseList     SEQUENCE (SIZE (1..maxNrofSR-Resources)) OF SchedulingRequestResourceId      OPTIONAL,  -- Need N
    multi-CSI-PUCCH-ResourceList        SEQUENCE (SIZE (1..2)) OF PUCCH-ResourceId                             OPTIONAL,   -- Need M
    dl-DataToUL-ACK                     SEQUENCE (SIZE (1..8)) OF INTEGER (0..15)                              OPTIONAL,   -- Need M
    spatialRelationInfoToAddModList     SEQUENCE (SIZE (1..maxNrofSpatialRelationInfos)) OF PUCCH-SpatialRelationInfo       OPTIONAL,  -- Need N
    spatialRelationInfoToReleaseList    SEQUENCE (SIZE (1..maxNrofSpatialRelationInfos)) OF PUCCH-SpatialRelationInfoId     OPTIONAL,  -- Need N
    pucch-PowerControl                  PUCCH-PowerControl                                                     OPTIONAL,   -- Need M
    ...,
    [[
    resourceToAddModListExt-r16         SEQUENCE (SIZE (1..maxNrofPUCCH-Resources)) OF PUCCH-ResourceExt-r16   OPTIONAL,   -- Need N
    dl-DataToUL-ACK-r16                 SetupRelease { DL-DataToUL-ACK-r16 }                                   OPTIONAL,   -- Need M
    ul-AccessConfigListForDCI-Format1-1-r16  SetupRelease { UL-AccessConfigListForDCI-Format1-1-r16 }          OPTIONAL,   -- Need R
    subslotLengthForPUCCH-r16           CHOICE {
        normalCP-r16                        ENUMERATED {n2,n7},
        extendedCP-r16                      ENUMERATED {n2,n6}
    }                                                                                                          OPTIONAL,   -- Need R
    dl-DataToUL-ACK-ForDCI-Format1-2-r16 SetupRelease { DL-DataToUL-ACK-ForDCI-Format1-2-r16 }                  OPTIONAL,   -- Need M
    numberOfBitsForPUCCH-ResourceIndicatorForDCI-Format1-2-r16    INTEGER (0..3)                               OPTIONAL,   -- Need R
    dmrs-UplinkTransformPrecodingPUCCH-r16  ENUMERATED {enabled}                                OPTIONAL,  -- Cond PI2-BPSK
    spatialRelationInfoToAddModList2-r16    SEQUENCE (SIZE (1..maxNrofSpatialRelationInfosDiff-r16)) OF PUCCH-SpatialRelationInfo     OPTIONAL,  -- Need N
    spatialRelationInfoToReleaseList2-r16   SEQUENCE (SIZE (1..maxNrofSpatialRelationInfosDiff-r16)) OF PUCCH-SpatialRelationInfoId   OPTIONAL,  -- Need N
    spatialRelationInfoToAddModListExt-r16  SEQUENCE (SIZE (1..maxNrofSpatialRelationInfos-r16)) OF PUCCH-SpatialRelationInfoExt-r16  OPTIONAL,  -- Need N
    spatialRelationInfoToReleaseListExt-r16 SEQUENCE (SIZE (1..maxNrofSpatialRelationInfos-r16)) OF PUCCH-SpatialRelationInfoId-r16   OPTIONAL,  -- Need N
    resourceGroupToAddModList-r16       SEQUENCE (SIZE (1..maxNrofPUCCH-ResourceGroups-r16)) OF PUCCH-ResourceGroup-r16     OPTIONAL,   -- Need N
    resourceGroupToReleaseList-r16      SEQUENCE (SIZE (1..maxNrofPUCCH-ResourceGroups-r16)) OF PUCCH-ResourceGroupId-r16   OPTIONAL,   -- Need M
    sps-PUCCH-AN-List-r16               SetupRelease { SPS-PUCCH-AN-List-r16 }                                 OPTIONAL,   -- Need N
    schedulingRequestResourceToAddModList-v1610  SEQUENCE (SIZE (1..maxNrofSR-Resources)) OF SchedulingRequestResourceConfig-v1610    OPTIONAL,  -- Need N
    ]]
}
```

```
PUCCH-FormatConfig ::=            SEQUENCE {
    interslotFrequencyHopping         ENUMERATED {enabled}                                OPTIONAL,   -- Need R
    additionalDMRS                    ENUMERATED {true}                                   OPTIONAL,   -- Need R
    maxCodeRate                       PUCCH-MaxCodeRate                                   OPTIONAL,   -- Need R
    nrofSlots                         ENUMERATED {n2,n4,n8}                               OPTIONAL,   -- Need S
    pi2BPSK                           ENUMERATED {enabled}                                OPTIONAL,   -- Need R
    simultaneousHARQ-ACK-CSI          ENUMERATED {true}                                   OPTIONAL,   -- Need R
}

PUCCH-MaxCodeRate ::=   ENUMERATED {zeroDot08, zeroDot15, zeroDot25, zeroDot35, zeroDot45, zeroDot60, zeroDot80}

-- A set with one or more PUCCH resources
PUCCH-ResourceSet ::=             SEQUENCE {
    pucch-ResourceSetId               PUCCH-ResourceSetId,
    resourceList                      SEQUENCE (SIZE (1..maxNrofPUCCH-ResourcesPerSet)) OF PUCCH-ResourceId,
    maxPayloadSize                    INTEGER (4..256)                                    OPTIONAL,   -- Need R
}

PUCCH-ResourceSetId ::=   INTEGER (0..maxNrofPUCCH-ResourceSets-1)

PUCCH-Resource ::=                SEQUENCE {
    pucch-ResourceId                  PUCCH-ResourceId,
    startingPRB                       PRB-Id,
    intraSlotFrequencyHopping         ENUMERATED { enabled }                              OPTIONAL,   -- Need R
    secondHopPRB                      PRB-Id                                              OPTIONAL,   -- Need R
    format                            CHOICE {
        format0                           PUCCH-format0,
        format1                           PUCCH-format1,
        format2                           PUCCH-format2,
        format3                           PUCCH-format3,
        format4                           PUCCH-format4
    }
}
```

FIG. 10C

```
PUCCH-ResourceExt-r16 ::=    SEQUENCE {
    interlaceAllocation-r16      SEQUENCE {
        rb-SetIndex                  INTEGER (0..4),
        interlace0                   CHOICE {
            scs15                        INTEGER (0..9),
            scs30                        INTEGER (0..4)
        }
    },
    formatExt-v1610              CHOICE {
        interlace1-v1610             INTEGER (0..9),
        occ-v1610                    SEQUENCE {
            occ-Length-v1610             ENUMERATED {n2,n4}            OPTIONAL,   -- Need R
            occ-Index-v1610              ENUMERATED {n0,n1,n2,n3}
        }                                                             OPTIONAL,   -- Need M
    }                                                                 OPTIONAL,   -- Need M
    ...
}

PUCCH-ResourceId ::=         INTEGER (0..maxNrofPUCCH-Resources-1)
```

```
UCCH-format0 ::=              SEQUENCE {
    initialCyclicShift             INTEGER(0..11),
    nrofSymbols                    INTEGER (1..2),
    startingSymbolIndex            INTEGER(0..13)
}

PUCCH-format1 ::=             SEQUENCE {
    initialCyclicShift             INTEGER(0..11),
    nrofSymbols                    INTEGER (4..14),
    startingSymbolIndex            INTEGER(0..10),
    timeDomainOCC                  INTEGER(0..6)
}

PUCCH-format2 ::=             SEQUENCE {
    nrofPRBs                       INTEGER (1..16),
    nrofSymbols                    INTEGER (1..2),
    startingSymbolIndex            INTEGER(0..13)
}

PUCCH-format3 ::=             SEQUENCE {
    nrofPRBs                       INTEGER (1..16),
    nrofSymbols                    INTEGER (4..14),
    startingSymbolIndex            INTEGER(0..10)
}

PUCCH-format4 ::=             SEQUENCE {
    nrofSymbols                    INTEGER (4..14),
    occ-Length                     ENUMERATED {n2,n4},
    occ-Index                      ENUMERATED {n0,n1,n2,n3},
    startingSymbolIndex            INTEGER(0..10)
}

PUCCH-ResourceGroup-r16 ::=   SEQUENCE {
    pucch-ResourceGroupId-r16      PUCCH-ResourceGroupId-r16,
    resourcePerGroupList-r16       SEQUENCE (SIZE (1..maxNrofPUCCH-ResourcesPerGroup-r16)) OF PUCCH-ResourceId
}

PUCCH-ResourceGroupId-r16 ::= INTEGER (0..maxNrofPUCCH-ResourceGroups-1-r16)

DL-DataToUL-ACK-r16 ::=       SEQUENCE (SIZE (1..8)) OF INTEGER (-1..15)

DL-DataToUL-ACK-ForDCI-Format1-2-r16 ::= SEQUENCE (SIZE (1..8)) OF INTEGER (0..15)

UL-AccessConfigListForDCI-Format1-1-r16 ::= SEQUENCE (SIZE (1..16)) OF INTEGER (0..15)

-- TAG-PUCCH-CONFIG-STOP
-- ASN1STOP
```

FIG. 11

```
-- ASN1START
-- TAG-PUCCH-SPATIALRELATIONINFO-START

PUCCH-SpatialRelationInfo ::=     SEQUENCE {
    pucch-SpatialRelationInfoId       PUCCH-SpatialRelationInfoId,
    servingCellId                     ServCellIndex                           OPTIONAL,   -- Need S
    referenceSignal                   CHOICE {
        ssb-Index                         SSB-Index,
        csi-RS-Index                      NZP-CSI-RS-ResourceId,
        srs                               PUCCH-SRS
    },
    pucch-PathlossReferenceRS-Id      PUCCH-PathlossReferenceRS-Id,
    p0-PUCCH-Id                       P0-PUCCH-Id,
    closedLoopIndex                   ENUMERATED { i0, i1 }
}

PUCCH-SpatialRelationInfoExt-r16 ::= SEQUENCE {
    pucch-SpatialRelationInfoId-v1610      PUCCH-SpatialRelationInfoId-v1610       OPTIONAL,   -- Cond SetupOnly
    pucch-PathlossReferenceRS-Id-v1610     PUCCH-PathlossReferenceRS-Id-v1610      OPTIONAL,   -- Need R
    ...
}

PUCCH-SRS ::=     SEQUENCE {
    resource        SRS-ResourceId,
    uplinkBWP       BWP-Id
}

-- TAG-PUCCH-SPATIALRELATIONINFO-STOP
-- ASN1STOP
```

FIG. 12A

```
-- ASN1START
-- TAG-SRS-CONFIG-START

SRS-Config ::=                              SEQUENCE {
  srs-ResourceSetToReleaseList                SEQUENCE (SIZE(1..maxNrofSRS-ResourceSets)) OF SRS-ResourceSetId    OPTIONAL,   -- Need N
  srs-ResourceSetToAddModList                 SEQUENCE (SIZE(1..maxNrofSRS-ResourceSets)) OF SRS-ResourceSet      OPTIONAL,   -- Need N
  srs-ResourceToReleaseList                   SEQUENCE (SIZE(1..maxNrofSRS-Resources)) OF SRS-ResourceId           OPTIONAL,   -- Need N
  srs-ResourceToAddModList                    SEQUENCE (SIZE(1..maxNrofSRS-Resources)) OF SRS-Resource             OPTIONAL,   -- Need N
  tpc-Accumulation                            ENUMERATED {disabled}                                                OPTIONAL,   -- Need S
  ...,
  [[
  srs-RequestForDCI-Format1-2-r16             INTEGER (1..2)                                                       OPTIONAL,   -- Need S
  srs-RequestForDCI-Format0-2-r16             INTEGER (1..2)                                                       OPTIONAL,   -- Need S
  srs-ResourceSetToAddModListForDCI-Format0-2-r16  SEQUENCE (SIZE(1..maxNrofSRS-ResourceSets)) OF SRS-ResourceSet  OPTIONAL,   -- Need N
  srs-ResourceSetToReleaseListForDCI-Format0-2-r16 SEQUENCE (SIZE(1..maxNrofSRS-ResourceSets)) OF SRS-ResourceSetId OPTIONAL,  -- Need N
  srs-PosResourceSetToReleaseList-r16         SEQUENCE (SIZE(1..maxNrofSRS-PosResourceSets-r16)) OF SRS-PosResourceSetId-r16
                                                                                                                   OPTIONAL,   -- Need N
  srs-PosResourceSetToAddModList-r16          SEQUENCE (SIZE(1..maxNrofSRS-PosResourceSets-r16)) OF SRS-PosResourceSet-r16
                                                                                                                   OPTIONAL,-- Need N
  srs-PosResourceToReleaseList-r16            SEQUENCE (SIZE(1..maxNrofSRS-PosResources-r16)) OF SRS-PosResourceId-r16
                                                                                                                   OPTIONAL,-- Need N
  srs-PosResourceToAddModList-r16             SEQUENCE (SIZE(1..maxNrofSRS-PosResources-r16)) OF SRS-PosResource-r16 OPTIONAL  -- Need N
  ]]
}
```

```
SRS-ResourceSet ::=        SEQUENCE {
    srs-ResourceSetId          SRS-ResourceSetId,
    srs-ResourceIdList         SEQUENCE (SIZE(1..maxNrofSRS-ResourcesPerSet)) OF SRS-ResourceId    OPTIONAL,  -- Cond Setup
    resourceType               CHOICE {
        aperiodic                  SEQUENCE {
            aperiodicSRS-ResourceTrigger   INTEGER (1..maxNrofSRS-TriggerStates-1),
            csi-RS                         NZP-CSI-RS-ResourceId                                   OPTIONAL,  -- Cond NonCodebook
            slotOffset                     INTEGER (1..32)                                         OPTIONAL,  -- Need S
            ...,
            [[
            aperiodicSRS-ResourceTriggerList   SEQUENCE (SIZE(1..maxNrofSRS-TriggerStates-2))
                                                   OF INTEGER (1..maxNrofSRS-TriggerStates-1)  OPTIONAL  -- Need M
            ]]
        },
        semi-persistent            SEQUENCE {
            associatedCSI-RS           NZP-CSI-RS-ResourceId                                       OPTIONAL,  -- Cond NonCodebook
            ...
        },
        periodic                   SEQUENCE {
            associatedCSI-RS           NZP-CSI-RS-ResourceId                                       OPTIONAL,  -- Cond NonCodebook
            ...
        }
    },
    usage                      ENUMERATED {beamManagement, codebook, nonCodebook, antennaSwitching},
    alpha                      Alpha                                                               OPTIONAL,  -- Need S
    p0                         INTEGER (-202..24)                                                  OPTIONAL,  -- Cond Setup
    pathlossReferenceRS        PathlossReferenceRS-Config                                          OPTIONAL,  -- Need M
    srs-PowerControlAdjustmentStates   ENUMERATED { sameAsFci2, separateClosedLoop}                OPTIONAL,  -- Need S
    ...,
    [[
    pathlossReferenceRSList-r16    SetupRelease { PathlossReferenceRSList-r16}                     OPTIONAL   -- Need M
    ]]
}
```

FIG. 12C

```
PathlossReferenceRS-Config ::=      CHOICE {
    ssb-Index                           SSB-Index,
    csi-RS-Index                        NZP-CSI-RS-ResourceId
}

PathlossReferenceRSList-r16 ::=     SEQUENCE (SIZE (1..maxNrofSRS-PathlossReferenceRS-r16)) OF PathlossReferenceRS-r16

PathlossReferenceRS-r16 ::=         SEQUENCE {
    srs-PathlossReferenceRS-Id-r16      SRS-PathlossReferenceRS-Id-r16,
    pathlossReferenceRS-r16             PathlossReferenceRS-Config
}

SRS-PathlossReferenceRS-Id-r16 ::=  INTEGER (0..maxNrofSRS-PathlossReferenceRS-1-r16)

SRS-PosResourceSet-r16 ::=          SEQUENCE {
    srs-PosResourceSetId-r16            SRS-PosResourceSetId-r16,
    srs-PosResourceIdList-r16           SEQUENCE (SIZE(1..maxNrofSRS-ResourcesPerSet)) OF SRS-PosResourceId-r16
                                                                                                                    OPTIONAL,  -- Cond Setup
    resourceType-r16                    CHOICE {
        aperiodic-r16                       SEQUENCE {
            aperiodicSRS-ResourceTriggerList-r16    SEQUENCE (SIZE(1..maxNrofSRS-TriggerStates-1))
                                                        OF INTEGER (1..maxNrofSRS-TriggerStates-1)
                                                                                                                    OPTIONAL,  -- Need M
            ...
        },
        semi-persistent-r16                 SEQUENCE {
            ...
        },
        periodic-r16                        SEQUENCE {
            ...
        }
    },
    alpha-r16                           Alpha
    p0-r16                              INTEGER (-202..24)
    pathlossReferenceRS-Pos-r16         CHOICE {
        ssb-IndexServing-r16                SSB-Index,
        ssb-Ncell-r16                       SSB-InfoNcell-r16,
        dl-PRS-r16                          DL-PRS-Info-r16
                                                                                                                    OPTIONAL,  -- Need S
                                                                                                                    OPTIONAL,  -- Cond Setup
    }
                                                                                                                    OPTIONAL,  -- Need M
    ...
}

SRS-ResourceSetId ::=               INTEGER (0..maxNrofSRS-ResourceSets-1)

SRS-PosResourceSetId-r16 ::=        INTEGER (0..maxNrofSRS-PosResourceSets-1-r16)
```

```
SRS-Resource ::=       SEQUENCE {
    srs-ResourceId         SRS-ResourceId,
    nrofSRS-Ports          ENUMERATED {port1, ports2, ports4},
    ptrs-PortIndex         ENUMERATED {n0, n1 }                    OPTIONAL,    -- Need R
    transmissionComb       CHOICE {
        n2                     SEQUENCE {
            combOffset-n2          INTEGER (0..1),
            cyclicShift-n2         INTEGER (0..7)
        },
        n4                     SEQUENCE {
            combOffset-n4          INTEGER (0..3),
            cyclicShift-n4         INTEGER (0..11)
        }
    },
    resourceMapping        SEQUENCE {
        startPosition          INTEGER (0..5),
        nrofSymbols            ENUMERATED {n1, n2, n4},
        repetitionFactor       ENUMERATED {n1, n2, n4}
    },
    freqDomainPosition     INTEGER (0..67),
    freqDomainShift        INTEGER (0..268),
    freqHopping            SEQUENCE {
        c-SRS                  INTEGER (0..63),
        b-SRS                  INTEGER (0..3),
        b-hop                  INTEGER (0..3)
    },
    groupOrSequenceHopping ENUMERATED { neither, groupHopping, sequenceHopping },
    resourceType           CHOICE {
        aperiodic              SEQUENCE {
            ...
        },
        semi-persistent        SEQUENCE {
            periodicityAndOffset-sp    SRS-PeriodicityAndOffset,
            ...
        },
        periodic               SEQUENCE {
            periodicityAndOffset-p     SRS-PeriodicityAndOffset,
            ...
        }
    },
    sequenceId             INTEGER (0..1023),
    spatialRelationInfo    SRS-SpatialRelationInfo                 OPTIONAL,    -- Need R
    ...,
    [[
    resourceMapping-r16    SEQUENCE {
        startPosition-r16      INTEGER (0..13),
        nrofSymbols-r16        ENUMERATED {n1, n2, n4},
        repetitionFactor-r16   ENUMERATED {n1, n2, n4}
    }                                                               OPTIONAL,    -- Need R
    ]]
}
```

FIG. 12E
                                                                                    ⤺ 1200E

```
SRS-PosResource-r16::=     SEQUENCE {
    srs-PosResourceId-r16      SRS-PosResourceId-r16,
    transmissionComb-r16       CHOICE {
        n2-r16                     SEQUENCE {
                                       combOffset-n2-r16         INTEGER (0..1),
                                       cyclicShift-n2-r16        INTEGER (0..7)
                                   },
        n4-r16                     SEQUENCE {
                                       combOffset-n4-r16         INTEGER (0..3),
                                       cyclicShift-n4-r16        INTEGER (0..11)
                                   },
        n8-r16                     SEQUENCE {
                                       combOffset-n8-r16         INTEGER (0..7),
                                       cyclicShift-n8-r16        INTEGER (0..5)
                                   },
        ...
    },
    resourceMapping-r16        SEQUENCE {
        startPosition-r16          INTEGER (0..13),
        nrofSymbols-r16            ENUMERATED {n1, n2, n4, n8, n12}
    },
    freqDomainShift-r16        INTEGER (0..268),
    freqHopping-r16            SEQUENCE {
        c-SRS-r16                  INTEGER (0..63),
        ...
    },
    groupOrSequenceHopping-r16 ENUMERATED { neither, groupHopping, sequenceHopping },
    resourceType-r16           CHOICE {
        aperiodic-r16              SEQUENCE {
                                       slotOffset-r16            INTEGER (1..32)                           OPTIONAL,    -- Need S
                                       ...
                                   },
        semi-persistent-r16        SEQUENCE {
                                       periodicityAndOffset-sp-r16    SRS-PeriodicityAndOffset-r16,
                                       ...
                                   },
        periodic-r16               SEQUENCE {
                                       periodicityAndOffset-p-r16     SRS-PeriodicityAndOffset-r16,
                                       ...
                                   }
    },
    sequenceId-r16             INTEGER (0..65535),
    spatialRelationInfoPos-r16 SRS-SpatialRelationInfoPos-r16                                              OPTIONAL,    -- Need R
    ...
}
```

FIG. 12F

```
SRS-SpatialRelationInfo ::=      SEQUENCE {
    servingCellId                    ServCellIndex                      OPTIONAL,    -- Need S
    referenceSignal                  CHOICE {
        ssb-Index                        SSB-Index,
        csi-RS-Index                     NZP-CSI-RS-ResourceId,
        srs                              SEQUENCE {
            resourceId                       SRS-ResourceId,
            uplinkBWP                        BWP-Id
        }
    }
}

SRS-SpatialRelationInfoPos-r16 ::=  CHOICE {
    servingRS-r16                    SEQUENCE {
        referenceSignal-r16              ServCellIndex
        servingCellId                    CHOICE {
            ssb-IndexServing-r16             SSB-Index,
            csi-RS-IndexServing-r16          NZP-CSI-RS-ResourceId,
            srs-SpatialRelation-r16          SEQUENCE {
                resourceSelection-r16            CHOICE {
                    srs-ResourceId-r16               SRS-ResourceId,
                    srs-PosResourceId-r16            SRS-PosResourceId-r16
                }
            }
        },
        uplinkBWP-r16                    BWP-Id
    },
    ssb-Ncell-r16                    SSB-InfoNcell-r16,
    dl-PRS-r16                       DL-PRS-Info-r16
}
```

```
SSB-Configuration-r16 ::=     SEQUENCE {
    ssb-Freq-r16                  ARFCN-ValueNR,
    halfFrameIndex-r16            ENUMERATED {zero, one},
    ssbSubcarrierSpacing-r16      SubcarrierSpacing,
    ssb-Periodicity-r16           ENUMERATED { ms5, ms10, ms20, ms40, ms80, ms160, spare2, spare1 }    OPTIONAL,  -- Need S
    sfn0-Offset-r16               SEQUENCE {
        sfn-Offset-r16                INTEGER (0..1023),
        integerSubframeOffset-r16     INTEGER (0..9)
    },
    sfn-SSB-Offset-r16            INTEGER (0..15),                                                      OPTIONAL,  -- Need R
    ss-PBCH-BlockPower-r16        INTEGER (-60..50)                                                     OPTIONAL,  -- Need R
                                                                                                        OPTIONAL   -- Cond Pathloss
}

SSB-InfoNcell-r16 ::=         SEQUENCE {
    physicalCellId-r16            PhysCellId,
    ssb-IndexNcell-r16            SSB-Index,                                                            OPTIONAL,  -- Need S
    ssb-Configuration-r16         SSB-Configuration-r16                                                 OPTIONAL   -- Need S
}

DL-PRS-Info-r16 ::=           SEQUENCE {
    dl-PRS-ID-r16                 INTEGER (0..255),
    dl-PRS-ResourceSetId-r16      INTEGER (0..7),
    dl-PRS-ResourceId-r16         INTEGER (0..63)                                                       OPTIONAL   -- Need S
}

SRS-ResourceId ::=            INTEGER (0..maxNrofSRS-Resources-1)
SRS-PosResourceId-r16 ::=     INTEGER (0..maxNrofSRS-PosResources-1-r16)

-- TAG-SRS-CONFIG-STOP
-- ASN1STOP
```

```
-- ASN1START
-- TAG-TCI-STATE-START

TCI-State ::=       SEQUENCE {
    tci-StateId         TCI-StateId,
    qcl-Type1           QCL-Info,
    qcl-Type2           QCL-Info                                OPTIONAL,       -- Need R
    ...
}

QCL-Info ::=        SEQUENCE {
    cell                ServCellIndex
    bwp-Id              BWP-Id                                  OPTIONAL,       -- Need R
    referenceSignal     CHOICE {                                OPTIONAL,       -- Cond CSI-RS-Indicated
        csi-rs              NZP-CSI-RS-ResourceId,
        ssb                 SSB-Index
    },
    qcl-Type            ENUMERATED {typeA, typeB, typeC, typeD},
    ...
}

-- TAG-TCI-STATE-STOP
-- ASN1STOP
```

1300

APPLYING SPATIAL RELATIONS TO UL TRANSMISSION OCCASIONS

CROSS-REFERENCE TO RELATED APPLICATION(S)

The present application claims the benefit of and priority to U.S. Provisional Patent Application No. 63/062,757, filed on Aug. 7, 2020, entitled "Method and Apparatus for Indicating Spatial Relation for UL Transmission in a Wireless Communication System," the content of which is hereby incorporated fully by reference into the present application.

FIELD

The present disclosure generally relates to wireless communications, and more particularly, to applying spatial relations to uplink (UL) transmission occasions by a user equipment (UE) for multiple transmission/reception points (TRPs) in next-generation wireless communication networks.

BACKGROUND

With the tremendous growth in the number of connected devices and the rapid increase in user/network traffic volume, various efforts have been made to improve various aspects of wireless communication for next-generation wireless communication systems, such as $5^{th}$ Generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

As part of this improvement process, in $3^{rd}$ Generation Partnership Project (3GPP) NR Release 16 (Rel-16), the use of multiple Transmission/Reception Points (TRPs) has been proposed, including related beam management procedure, physical channel/Reference Signal (RS) design, and reliability enhancement for URLLC. For example, reliability enhancement of receiving a Physical Downlink Shared Channel (PDSCH) has been addressed in NR Rel-16. In future releases (e.g., Rel-17), reliability and robustness of other channels (e.g., Physical Downlink Control Channel (PDCCH), Physical Uplink Control Channel (PUCCH), Physical Uplink Shared Channel (PUSCH)) may also be enhanced to improve system performance.

Additionally, a repetition procedure for PUCCH transmission has been proposed, in which a PUCCH resource may be transmitted repeatedly over more than one PUCCH transmission occasion (e.g., consecutive PUCCH transmission occasions). One PUCCH transmission occasion could be slot-based or sub-slot-based. However, this PUCCH repetition procedure presumes use of a single TRP, and thus involves the use of a signal spatial relation associated with the TRP over all UL repetitions, such as PUCCH repetitions.

SUMMARY

The present disclosure is directed to using multiple spatial relations for UL transmissions by a user equipment (UE) (e.g., to multiple TRPs).

In a first aspect of the present application, a method for a user equipment (UE) is provided. The method may include receiving a first configuration for configuring one or more physical uplink control channel (PUCCH) resources. The method may further include receiving a second configuration for configuring a plurality of spatial relations, each spatial relation including a spatial parameter for uplink (UL) transmission and a parameter for UL power control. The method may further include receiving a signal that indicates at least one of a first mode or a second mode and receiving downlink control information (DCI) indicating a PUCCH resource from the one or more PUCCH resources, where first and second spatial relations of the plurality of spatial relations are activated for the PUCCH resource. The method may also include deriving a plurality of PUCCH transmission occasions associated with the indicated PUCCH resource. The method may further include transmitting a same uplink control information (UCI) content on each of the plurality of PUCCH transmission occasions. When a total number of the plurality of PUCCH transmission occasions is larger than two and the signal indicates the first mode, the first spatial relation may be applied on (4*N+1)-th and (4*N+2)-th PUCCH transmission occasions among the plurality of PUCCH transmission occasions for a PUCCH transmission and power control setting, wherein N is an integer equal to, or greater than, zero, and the second spatial relation may be applied on (4*N+3)-th and (4*N+4)-th PUCCH transmission occasions among the plurality of PUCCH transmission occasions for the PUCCH transmission and power control setting. Additionally, when the total number of the plurality of PUCCH transmission occasions is equal to two, or when the total number of the plurality of PUCCH transmission occasions is larger than two, and the signal indicates the second mode, the first spatial relation may be applied on (2*N+1)-th PUCCH transmission occasions among the plurality of PUCCH transmission occasions for the PUCCH transmission and power control setting, and the second spatial relation may be applied on (2*N+2)-th PUCCH transmission occasions among the plurality of PUCCH transmission occasions for the PUCCH transmission and power control setting.

In an implementation of the first aspect, the signal may include a Remote Resource Control (RRC) parameter.

In another implementation of the first aspect, the DCI may include a DCI scheduling downlink transmission.

In another implementation of the first aspect, the first spatial relation and the second spatial relation may be activated by a single Medium Access Control-Control Element (MAC-CE).

In another implementation of the first aspect, each of the first and second spatial relations may be activated by a different MAC-CE.

In another implementation of the first aspect, the plurality of PUCCH transmission occasions may correspond to a plurality of time units. In some implementations, each time unit of the plurality of time units may be one of a slot, a sub-slot, a mini-slot, or a number of symbols.

In another implementation of the first aspect, receiving the first and second configurations may include receiving the first and second configurations from at least one of first and second transmission reception points (TRPs).

In another implementation of the first aspect, the first configuration may be associated with a first value of an index, the second configuration may be associated with a second value of the index, and the index may be associated with a Control Resource Set pool index (CORESETPoolIndex).

In another implementation of the first aspect, each PUCCH transmission occasion may be transmitted to one of first and second TRPs.

In a second aspect, a UE comprising one or more non-transitory computer-readable media having computer-executable instructions is provided. The processor is coupled to the one or more non-transitory computer-readable media, and configured to execute the computer-executable instructions to receive a first configuration for configuring one or more physical uplink control channel (PUCCH) resources; receive a second configuration for configuring a plurality of spatial relations, each spatial relation comprising a spatial parameter for uplink (UL) transmission and a parameter for UL power control; receive a signal that indicates at least one of a first mode or a second mode; receive downlink control information (DCI) indicating a PUCCH resource from the one or more PUCCH resources, wherein first and second spatial relations of the plurality of spatial relations are activated for the PUCCH resource; derive a plurality of PUCCH transmission occasions associated with the indicated PUCCH resource; and transmit a same uplink control information (UCI) content on each of the plurality of PUCCH transmission occasions. When a total number of the plurality of PUCCH transmission occasions is larger than two and the signal indicates the first mode, the at least one processor is further configured to execute the computer-executable instructions to apply the first spatial relation on (4*N+1)-th and (4*N+2)-th PUCCH transmission occasions among the plurality of PUCCH transmission occasions for a PUCCH transmission and power control setting, wherein N is an integer equal to, or greater than, zero, and apply the second spatial relation on (4*N+3)-th and (4*N+4)-th PUCCH transmission occasions among the plurality of PUCCH transmission occasions for the PUCCH transmission and power control setting. When the total number of the plurality of PUCCH transmission occasions is equal to two, or when the total number of the plurality of PUCCH transmission occasions is larger than two and the signal indicates the second mode, the at least one processor is further configured to execute the computer-executable instructions to apply the first spatial relation on (2*N+1)-th PUCCH transmission occasions among the plurality of PUCCH transmission occasions for the PUCCH transmission and power control setting, and apply the second spatial relation on (2*N+2)-th PUCCH transmission occasions among the plurality of PUCCH transmission occasions for the PUCCH transmission and power control setting.

In an implementation of the second aspect, the signal may include a Radio Resource Control (RRC) parameter.

In another implementation of the second aspect, the DCI may include a DCI scheduling downlink transmission.

In another implementation of the second aspect, the first spatial relation and the second spatial relation may be activated by a single MAC-CE.

In another implementation of the second aspect, each of the first and second spatial relations may be activated by a different MAC-CE.

In another implementation of the second aspect, the plurality of PUCCH transmission occasions may correspond to a plurality of time units.

In another implementation of the second aspect, each time unit of the plurality of time units may be one of a slot, a sub-slot, a mini-slot, or a number of symbols.

In another implementation of the second aspect, the first and second configurations may be received from at least one of first and second transmission reception points (TRPs).

In another implementation of the second aspect, the first configuration may be associated with a first value of an index, the second configuration may be associated with a second value of the index, and the index may be associated with a Control Resource Set pool index (CORESETPoolIndex).

In another implementation of the second aspect, each PUCCH transmission occasion may be transmitted to one of first and second TRPs.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

FIG. 7 is a state transition diagram illustrating a UE state machine and associated state transitions in NR and E-UTRA networks, according to an example implementation of the present application.

FIG. 8 is a diagram illustrating a Bandwidth Part Uplink Dedicated (BWP-UplinkDedicated) Information Element (IE), according to an example implementation of the present application.

FIG. 9 is a diagram illustrating a Control Resource Set (ControlResourceSet) IE, according to an example implementation of the present application.

FIGS. 10A-10D are diagrams illustrating a PUCCH Configuration (PUCCH-Config) IE, according to an example implementation of the present application.

FIG. 11 is a diagram illustrating a PUCCH Spatial Relation Information (PUCCH-SpatialRelationInfo) IE, according to an example implementation of the present application.

FIGS. 12A-12G are diagrams illustrating a Sounding Reference Signal (SRS) Configuration (SRS-Config) IE, according to an example implementation of the present application.

FIG. 13 is a diagram illustrating a Transmission Configuration Indicator (TCI) State (TCI-State) IE, according to an example implementation of the present application.

DETAILED DESCRIPTION

Figure 1:
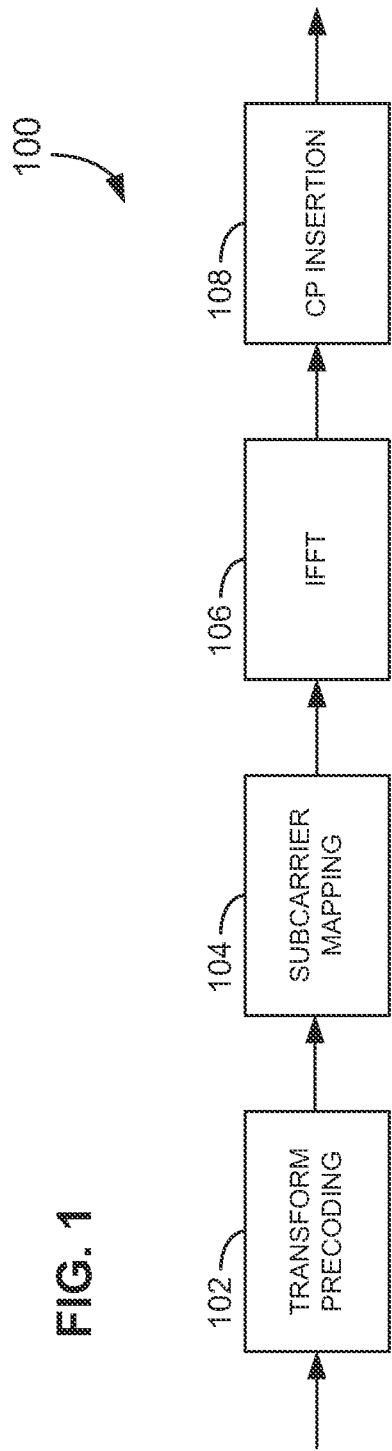
FIG. 1 is a block diagram illustrating a transmitter employable for UL and/or DL transmissions, according to an example implementation of the present application.

The acronyms in the present application are defined as follows and unless otherwise specified, the acronyms have the following meanings:

| Acronym | Full name |
| --- | --- |
| 3GPP | 3$^{rd}$ Generation Partnership Project |
| 5G | 5$^{th}$ Generation |
| 5GC | 5$^{th}$ Generation Core |
| 5G-S-TMSI | 5G Serving Temporary Mobile Subscriber Identity |
| ACK | Acknowledgement |
| Alt | Alternative |
| AMF | Access and Mobility Management Function |
| AoA | Angle of Arrival |
| AoD | Angle of Departure |
| AS | Access Stratum |
| BFR | Beam Failure Recovery |
| BFRQ | Beam Failure Recovery Request |
| BL | Band-Limited |
| BPSK | Binary Phase Shift Keying |
| BS | Base Station |
| CA | Carrier Aggregation |
| CB | Contention-Based |
| CC | Component Carrier |
| CCCH | Common Control Channel |
| CCE | Control Channel Element |
| CE | Control Element |
| CF | Contention-Free |
| CG | Configured grant |
| CG-DFI | CG Downlink Feedback Information |
| CG-UCI | CG Uplink Control Information |
| CLI | Cross Link Interference |
| CN | Core Network |
| CORESET | Control Resource Set |
| CP | Cyclic Prefix |
| CRC | Cyclic Redundancy Check |
| CRI | CSI-RS Resource Index |
| C-RNTI | Cell Radio Network Temporary Identifier |
| CSI | Channel State Information |
| CSI-RS | Channel State Information-based Reference Signal |
| CSI-RSRP | Channel State Information-based Reference Signal Received Power |
| DAI | Downlink Assignment Index |
| DC | Downlink Control |
| DCI | Downlink Control Information |
| DFT | Direct Fourier Transform |
| DL | Downlink |
| DL-SCH | Downlink Shared Channel |
| DMRS | Demodulation Reference Signal |
| DRX | Discontinuous Reception |
| E-CID | Enhanced Cell ID |
| EDT | Early Data Transmission |
| EPC | Evolved Packet Core |
| E-UTRA | Evolved-Universal Terrestrial Radio Access |
| FDD | Frequency Division Duplexing |
| FR | Frequency Range |
| eNB | evolved Node B (e.g., 4G Node B) |
| gNB | next-generation Node B (e.g., 5G Node B) |
| HARQ | Hybrid Automatic Repeat Request |
| IAB | Integrated Access and Backhaul |
| IE | Information Element |
| IFFT | Inverse Fast Fourier Transform |
| LBT | Listen Before Talk |
| LCID | Logical Channel ID |
| LDPC | Low-Density Parity Check |
| LRR | Link Recovery Request |
| LTE | Long-Term Evolution |
| MAC | Medium Access Control |
| MIB | Master Information Block |
| MIMO | Multiple Input, Multiple Output |
| MPE | Maximum Permissible Exposure |
| MSG | Message |
| MU-MIMO | Multiple-User Multiple Input, Multiple Output |
| NAK | Non-Acknowledgement |
| NCGI | NR Cell Global Identifier |
| NG-RAN | Next-Generation-Radio Access Network |
| NR | New Radio (or Radio Access Technology (RAT)) |
| NW | Network |
| OFDM | Orthogonal Frequency Division Multiplex |
| PBCH | Physical Broadcast Channel |
| PCell | Primary Cell |
| PDCCH | Physical Downlink Control Channel |
| PDSCH | Physical Downlink Shared Channel |
| PDU | Packet Data Unit |
| PH | Power Headroom |
| PHY | Physical Broadcast Channel |
| PRACH | Physical Random Access Channel |
| PRB | Physical Resource Block |
| PRG | Precoding Resource Block Group |
| PRS | Positioning Reference Signal |
| P-RNTI | Paging Radio Network Temporary Identifier |
| PSCell | Primary Secondary Cell |
| PSS | Primary Synchronization Signal |
| PTAG | Primary TAG |
| PTRS | Phase-Tracking Reference Signal |
| PUCCH | Physical Uplink Control Channel |
| PUSCH | Physical Uplink Shared Channel |
| PUR | Preconfigured UL Resource |
| QCL | Quasi-Colocation |
| QPSK | Quadrature Phase Shift Keying |
| RA | Random Access |
| RACH | Random Access Channel |
| RAN | Radio Access Network |
| RAPID | Random Access Preamble Index |
| RAR | Random Access Response |
| RAT | Radio Access Technology |
| RA-RNTI | Random Access Radio Network Temporary Identifier |
| RMSI | Remaining Minimum System Information |
| RNA | RAN-based Notification Area |
| RNTI | Radio Network Temporary Identifier |
| RRC | Radio Resource Control |
| RS | Reference Signal |
| RSRP | Reference Signal Received Power |
| RSRQ | Reference Signal Received Quality |
| RSTD | Reference Signal Time Difference |
| RTOA | Relative Time of Arrival |
| RTT | Round-Trip Time |
| RX | Reception |
| SCell | Secondary Cell |
| SCG | Secondary Cell Group |
| SDU | Service Data Unit |
| SFN | System Frame Number |
| SI | System Information |
| SIB | System Information Block |
| SINR | Signal to Interference plus Noise Ratio |
| SR | Scheduling Request |
| SRS | Sounding Reference Signal |
| STAG | Secondary TAG |
| SpCell | Special Cell |
| SS | Synchronization Signal |
| SSB | Synchronization Signal Block |
| SSS | Secondary Synchronization Signal |
| SS-RSRP | Synchronization Signal-Reference Signal Received Power |
| SU-MIMO | Single-User Multiple Input, Multiple Output |
| SUL | Supplementary Uplink |
| TA | Timing Advance or Time Alignment |
| TAG | Time Alignment Group |
| TB | Transport Block |
| TBS | Transport Block Size |
| TDD | Time Division Duplexing |
| TDOA | Time Difference of Arrival |
| TRP | Transmission/Reception Point |

-continued

| Acronym | Full name |
|---|---|
| TS | Technical Specification |
| TTI | Transmission Time Interval |
| TX | Transmission |
| UCI | Uplink Control Information |
| UE | User Equipment |
| UL | Uplink |
| UL-SCH | Uplink Shared Channel |
| UPF | User Plane Function |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

Any two or more than two of the following paragraphs, (sub)-bullets, points, actions, or claims described in each embodiment/implementation/concept may be combined logically, reasonably, and properly to form a specific method. Also, any sentence, paragraph, (sub)-bullet, point, action, or claim described in each of the following embodiment(s)/implementation(s)/concept(s) may be implemented independently and separately to form a specific method. Dependency (e.g., "based on", "more specifically", "where"; etc.) in the following embodiment(s)/implementation(s)/concept(s) is just one possible embodiment which would not restrict the specific method.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Application-Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or a 5G NR Radio Access Network (RAN)) typically includes at least one base station, at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), Long-Term Evolution (LTE), LTE-A, eLTE (evolved LTE, e.g., LTE connected to 5GC), New Radio (NR, often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise, the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

Figure 2:
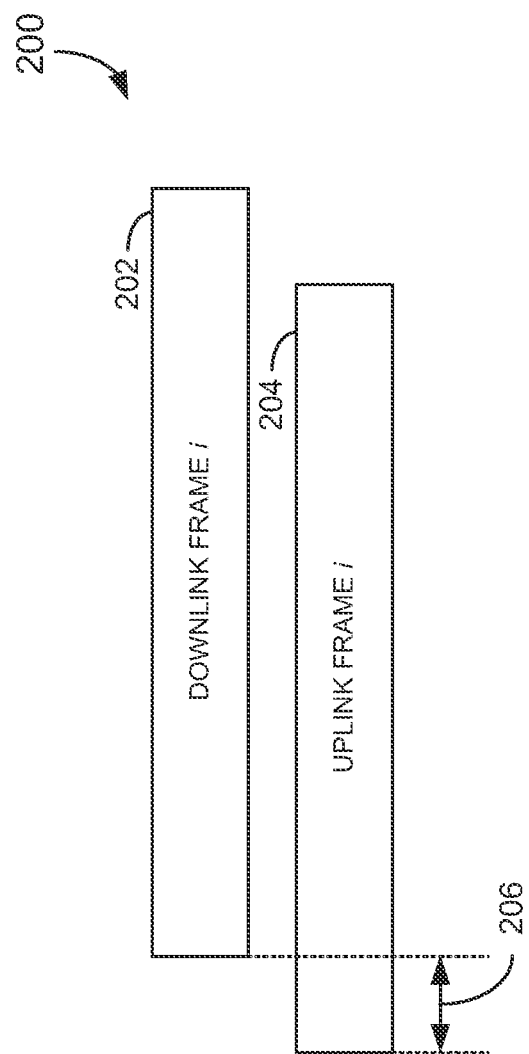
FIG. 2 is a diagram illustrating a timing relation between a UL frame and a DL frame, according to an example implementation of the present application.
Figure 3:
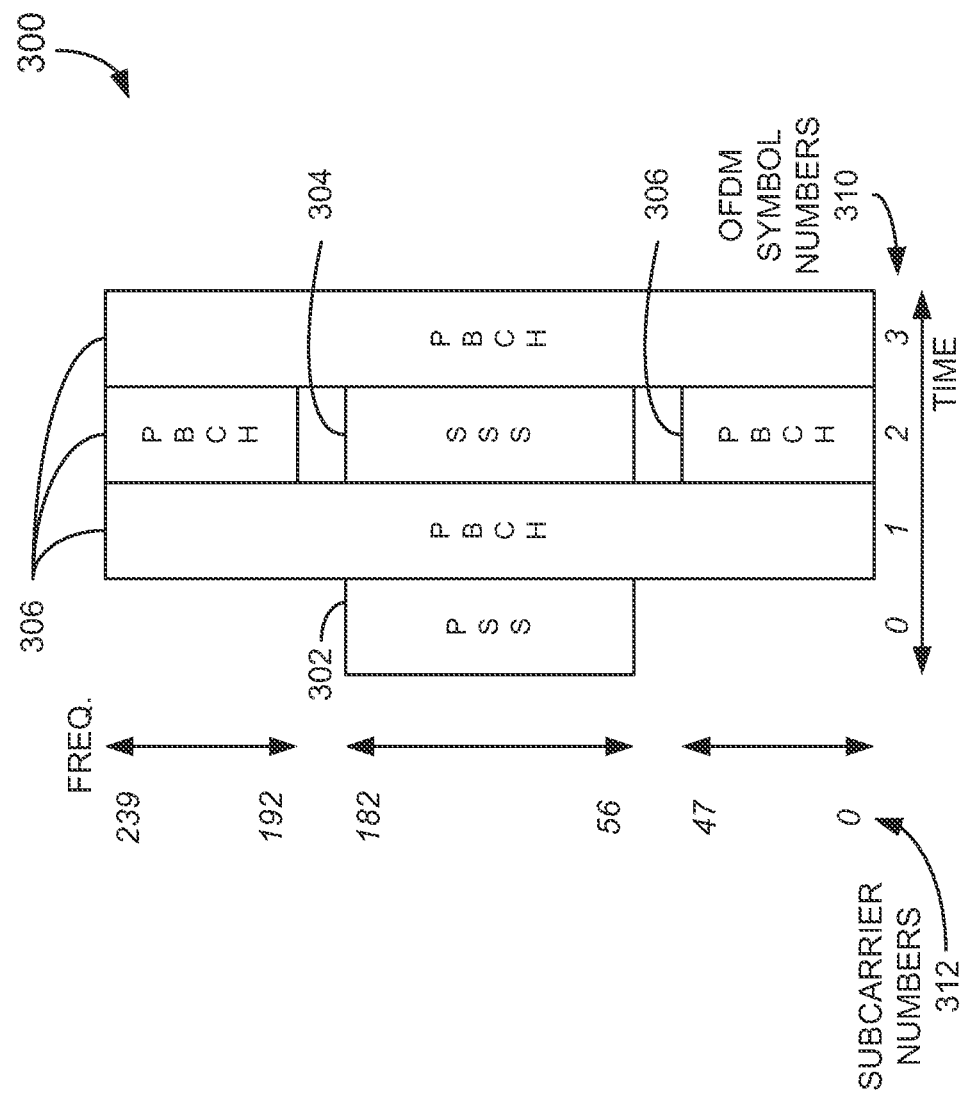
FIG. 3 is a diagram illustrating a time-frequency structure of a Synchronization Signal (and Physical Broadcast Channel (PBCH)) Block (SSB), according to an example implementation of the present application.

FIGS. 1-3 illustrate aspects of an overview of the physical layer of an NR and NG-RAN communication system, as described below.

Waveform, Numerology, and Frame Structure

FIG. 1 is a block diagram illustrating a transmitter 100 employable for UL and/or DL transmissions, according to an example implementation of the present application. As shown in FIG. 1, and as indicated in $3^{rd}$ Generation Partnership Project (3GPP) Technical Specification (TS) 38.300 Rel-16, transmitter 100 may include a transform precoding block 102, a subcarrier mapping block 104, an Inverse Fast Fourier Transform (IFFT) block 106, and a cyclic prefix (CP) insertion block 108. A DL transmission waveform may be conventional Orthogonal Frequency Division Multiplex (OFDM) (e.g., using IFFT block 106) employing a CP (e.g., using CP insertion block 108), but without using transform precoding block 102. The UL transmission waveform may be conventional OFDM using a CP with, transform precoding block 102 performing DFT spreading that may be disabled or enabled. For operation with shared spectrum channel access, the UL transmission waveform subcarrier mapping (using subcarrier mapping block 104) may map to subcarriers in one or more Physical Resource Block (PRB) interlaces.

In some implementations, the communication system may operate under one of a set of "numerologies," or subcarrier spacings, as facilitated by subcarrier mapping block 104. As shown in Table 1 below, the numerology may be based on exponentially scalable subcarrier spacing Δf=$2^\mu$×15 kHz with μ={0, 1, 3, 4} for a Primary Synchronization Signal (PSS), a Secondary Synchronization Signal (SSS), and a Physical Broadcast Channel (PBCH), and μ={0, 1, 2, 3} for other channels. A "Normal CP" may be supported for all subcarrier spacings, while an "Extended CP" may be supported for μ=2. Twelve consecutive subcarriers may form a Physical Resource Block (PRB). Up to 275 PRBs may be supported on a carrier.

TABLE 1

| μ | Δf = $2^\mu$ · 15 [kHz] | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

The UE may be configured with one or more bandwidth parts (BWPs) on a given component carrier, of which only one may be active at a time. The active BWP may define the UE's operating bandwidth within the cell's operating bandwidth. For initial access, and until the UE's configuration in a cell is received, the initial BWP detected from system information may be used.

DL and UL transmissions may be organized into frames with 10 millisecond (ms) duration, with each frame including ten 1-ms subframes. Each frame may be divided into two equally-sized half-frames of five subframes each. The slot duration may be 14 symbols with Normal CP and 12 symbols with Extended CP, and the slot duration may scale in time as a function of the used subcarrier spacing so that there may always be an integer number of slots in a subframe.

FIG. 2 is a diagram illustrating a timing relation 200 between a UL frame 204 and a corresponding DL frame 202, according to an example implementation of the present application. As depicted, a timing advance (TA) 206 may be used to adjust a timing of UL frame 204 relative to a timing of DL frame 202. In some implementations, timing advance 206 may be $(N_{TA}+N_{TA,offset})*T_c$, where $N_{TA}$ may be a numerical timing advance value from a Medium Access Control-Control Element (MAC-CE) or a Random Access Response (RAR), $N_{TA,offset}$ may be a numerical timing advance offset value provided to the UE, and $T_c$ may be a present clock time (e.g., 0.509 nanoseconds (ns)). The timing advance may be initiated by a special command or notification received from a base station (e.g., an eNB), and the advance may be applied to a Physical Uplink Shared Channel (PUSCH), a Physical Uplink Control Channel (PUCCH), and/or a Sounding Reference Signal (SRS).

Downlink Transmission Scheme

In some implementations, in a scheme for DL transmission, a closed-loop Demodulation Reference Signal (DMRS)-based spatial multiplexing may be supported for a Physical Downlink Shared Channel (PDSCH). Up to 8 and 12 orthogonal DL DMRS ports may be supported for type 1 and type 2 DMRS, respectively. Up to 8 orthogonal DL DMRS ports per UE may be supported for Single-User Multiple Input, Multiple Output (SU-MIMO) antenna operations and up to 4 orthogonal DL DMRS ports per UE may be supported for Multiple-User MIMO (MU-MIMO) antenna operations. The number of SU-MIMO code words may be one for 1-to-4-layer transmissions and two for 5-to-8-layer transmissions.

The DMRS and corresponding PDSCH may be transmitted using the same precoding matrix, and the UE may not need to know the precoding matrix to demodulate the transmission. Transmitter 100 (as shown in FIG. 1) may use different precoder matrices (e.g., using transform precoding block 102) for different parts of the transmission bandwidth, resulting in frequency-selective precoding. The UE may also assume that the same precoding matrix is used across a set of PRBs denoted a Precoding Resource Block Group (PRG). In some implementations, transmission durations from two to fourteen symbols in a slot may be supported. Also, aggregation of multiple slots with Transport Block (TB) repetition may be supported.

Physical Layer Processing for PDSCH

The following operations may be performed for DL physical layer processing of transport channels:

TB Cyclic Redundancy Check (CRC) attachment;
Code block segmentation and code block CRC attachment;
Channel coding: Low-Density Parity Check (LDPC) coding;
Physical layer Hybrid Automatic Repeat Request (HARQ) processing; Rate matching;
Scrambling;
Modulation: Quadrature Phase Shift Keying (QPSK), 16QAM (Quadrature Amplitude Modulation), 64QAM and 256QAM;
Layer mapping; and
Mapping to assigned resources and antenna ports.

The UE may assume that at least one symbol with DMRS is present on each layer in which PDSCH is transmitted to a UE, and up to 3 additional DMRS may be configured by higher layers. In some implementations, a Phase-Tracking Reference Signal (PTRS) may be transmitted on additional symbols to aid receiver phase-tracking.

Physical Downlink Control Channel (PDCCH)

The Physical Downlink Control Channel (PDCCH) can be used to schedule DL transmissions on PDSCH and UL transmissions on a Physical Uplink Shared Channel (PUSCH). The PDCCH may carry Downlink Control Information (DCI), which may include the following:

DL assignments including modulation and coding format, resource allocation, and HARQ information related to a Downlink Shared Channel (DL-SCH) (e.g., as specified in TS 38.202); and UL scheduling grants including modulation and coding format, resource allocation, and HARQ information related to Uplink Shared Channel (UL-SCH) (e.g., as specified in TS 38.202).

In addition to scheduling, PDCCH may be used for one or more of the following:

Activation and deactivation of configured PUSCH transmission with configured grant;
Activation and deactivation of PDSCH semi-persistent transmission;
Notifying one or more UEs of the slot format;
Notifying one or more UEs of the PRB(s) and OFDM symbol(s) where the UE may assume no transmission is intended for the UE;
Transmission of TPC commands for PUCCH and PUSCH;
Transmission of one or more TPC commands for SRS transmissions by one or more UEs;
Switching a UE's active BWP;
Initiating a random-access procedure;
Indicating the UE(s) to monitor the PDCCH during the next occurrence of a Discontinuous Reception (DRX) on-duration;

In an Integrated Access and Backhaul (IAB) context, indicating the availability for soft symbols of an IAB Distributed Unit (IAB-DU).

A UE may monitor a set of PDCCH candidates in the configured monitoring occasions in one or more configured Control Resource Sets (CORESETs) according to the corresponding search space configurations. A CORESET may include a set of PRBs with a time duration of 1-to-3 OFDM symbols. The resource units Resource Element Groups (REGs) and Control Channel Elements (CCEs) may be defined within a CORESET, with each CCE including a set of REGs. Control channels may be formed by aggregation of CCEs. Different code rates for the control channels may be realized by aggregating different numbers of CCEs. Interleaved and non-interleaved CCE-to-REG mapping may be supported in a CORESET.

In some implementations, polar coding and QPSK modulation may be used for a PDCCH. Each REG carrying PDCCH may carry its own DMRS.

Synchronization Signal (and PBCH) Block (SSB)

FIG. 3 is a diagram illustrating a time-frequency structure of a Synchronization Signal (and Physical Broadcast Channel (PBCH)) Block (SSB) 300, according to an example implementation of the present application. The SSB may include a Primary Synchronization Signal (PSS) 302 and a Secondary Synchronization Signal (SSS) 304, each occupying one OFDM symbol 310, as well as 127 subcarriers 312. SSB 300 may also include a PBCH 306 (e.g., as described in TS 38.202) spanning across three OFDM symbols 310 and 240 subcarriers 312, but on one symbol leaving an unused part in the middle for SSS 304, as shown in FIG. 3. The possible time locations of SSBs 300 within a half-frame may be determined by the subcarrier spacing, and the periodicity of the half-frames where SSBs 300 are transmitted may be configured by the network. During a half-frame, different SSBs 300 may be transmitted in different spatial directions (e.g., using different beams, spanning the coverage area of a cell).

Within the frequency span of a carrier, multiple SSBs 300 may be transmitted. The PCIs of SSBs 300 transmitted in different frequency locations do not have to be unique (e.g., different SSBs 300 in the frequency domain may have different PCIs). However, when an SSB 300 is associated with a Remaining Minimum System Information (RMSI), SSB 300 may correspond to an individual cell, which may have a unique NR Cell Global Identifier (NCGI). Such an SSB 300 may be referred to as a Cell-Defining SSB (CD-SSB). A PCell may be associated with a CD-SSB located on the synchronization raster.

In some implementations, polar coding and QPSK modulation may be used for PBCH 306. The UE may assume a band-specific subcarrier spacing for SSB 300 unless a network has configured the UE to assume a different subcarrier spacing.

Downlink Link Adaptation

Link adaptation (e.g., Adaptive Modulation and Coding (AMC)) with various modulation schemes and channel coding rates may be applied to the PDSCH. The same coding and modulation may be applied to all groups of resource blocks belonging to the same Layer-2 (L2) Packet Data Unit (PDU) scheduled to one user within one transmission duration and within a MIMO codeword.

For channel state estimation purposes, the UE may be configured to measure a Channel State Information-based Reference Signal (CSI-RS) and estimate the downlink channel state based on the CSI-RS measurements. The UE may feed the estimated channel state back to the gNB to be used in link adaptation. Some procedures employed by one or more aspects of the present implementations are described below.

Downlink Power Control

DL power control may be employed.

Cell Search

Cell search is the procedure by which a UE may acquire time and frequency synchronization with a cell and may detect the Cell ID of that cell. NR cell search may be based on PSS 302 and SSS 304, and on PBCH 306 DMRS, located on the synchronization raster.

Downlink Hybrid Automatic Repeat Request (HARM)

Asynchronous Incremental Redundancy Hybrid Automatic Repeat Request (HARQ) may be supported. The gNB may provide the UE with the HARQ Acknowledgement (HARQ-ACK) feedback timing either dynamically in the DCI or semi-statically in an RRC configuration. Retransmission of HARQ-ACK feedback may be supported for operation with shared-spectrum channel access by using enhanced dynamic codebook and/or one-shot triggering of HARQ-ACK transmission for all configured Component Carriers (CCs) and HARQ processes in the PUCCH group. The UE may be configured to receive code block group-based transmissions where retransmissions may be scheduled to carry a subset of all the code blocks of a TB.

Reception of System Information Block 1 (SIB1)

A Master Information Block (MIB) on PBCH may provide the UE with parameters (e.g., CORESET #0 configuration) for monitoring of PDCCH for scheduling PDSCH that carries the System Information Block 1 (SIB1). PBCH may also indicate that there is no associated SIB1, in which case the UE may be directed to another frequency from where to search for an SSB that is associated with a SIB1, as well as a frequency range where the UE may assume no SSB associated with SIB1 is present. The indicated frequency range may be confined within a contiguous spectrum allocation of the same operator in which SSB is detected.

Downlink Reference Signals and Measurements for Positioning

The DL Positioning Reference Signals (DL PRS) may be defined to facilitate support of different positioning methods, such as DL Time Difference of Arrival (DL-TDOA), DL Angle of Departure (DL-AoD), and multi-RTT (multiple Round-Trip Time) through the following set of UE measurements of DL Reference Signal Time Difference (DL RSTD), DL Positioning Reference Signal-Reference Signal Received Power (DL PRS-RSRP), and UE Reception-Transmission (RX-TX) time difference, respectively (e.g., as described in TS 38.305).

In some implementations, besides DL PRS signals, the UE may use SSB and a Channel State Information-based Reference Signal (CSI-RS) (e.g., Reference Signal Received Power (RSRP) and Reference Signal Received Quality (RSRQ)) measurements for Radio Resource Management (RRM) for Enhanced Cell ID (E-CID) type of positioning.

Uplink Transmission Scheme

Two UL transmission schemes may be supported for PUSCH: codebook-based transmission and non-codebook-based transmission. For codebook-based transmission, the gNB may provide the UE with a transmit precoding matrix indication in the DCI. The UE may use the indication to select the PUSCH transmit precoder from the codebook. For non-codebook-based transmission, the UE may determine its PUSCH precoder based on a wideband Sounding Reference Signal (SRS) Resource Identifier (SRI) field from the DCI.

A closed loop DMRS-based spatial multiplexing scheme may be supported for PUSCH. For a given UE, up to 4-layer transmissions may be supported. The number of code words may be one. When transform precoding is used, only a single MIMO layer transmission may be supported.

Transmission durations from 1 to 14 symbols in a slot may be supported. Aggregation of multiple slots with TB repetition may be supported.

Two types of frequency hopping may be supported: intra-slot frequency hopping and (in case of slot aggregation) inter-slot frequency hopping. Intra-slot and inter-slot frequency hopping may not be supported when a PRB interlace uplink transmission waveform is used.

PUSCH may be scheduled with DCI on PDCCH, or a semi-static configured grant may be provided over RRC, where two types of operation may be supported:

The first PUSCH is triggered with a DCI, with subsequent PUSCH transmissions following the RRC configuration and scheduling received on the DCI, or The PUSCH is triggered by data arrival to the UE's transmit buffer and the PUSCH transmissions follow the RRC configuration.

Physical-Layer Processing for Physical Uplink Shared Channel (PUSCH)

The UL physical-layer processing of transport channels may include the following operations:

Transport Block CRC attachment;
Code block segmentation and Code Block CRC attachment;
Channel coding: LDPC coding;
Physical-layer hybrid-ARQ processing;
Rate matching;
Scrambling;
Modulation: $\pi/2$ Binary Phase Shift Keying (BPSK) (with transform precoding only), QPSK, 16QAM, 64QAM and 256QAM;
Layer mapping, transform precoding (enabled/disabled by configuration), and precoding;
Mapping to assigned resources and antenna ports.

The UE may transmit at least one symbol with a Demodulation Reference Signal (DMRS) on each layer on each frequency hop in which the PUSCH is transmitted, and up to three additional DMRS may be configured by higher layers.

A Phase-Tracking Reference Signal (PTRS) may be transmitted on additional symbols to aid receiver phase-tracking.

For configured grant operation with shared spectrum channel access, a Configured Grant Uplink Control Information (CG-UCI) may be transmitted in the PUSCH scheduled by a configured uplink grant.

Physical Uplink Control Channel (PUCCH)

The Physical Uplink Control Channel (PUCCH) may carry the Uplink Control Information (UCI) from the UE to the gNB. Five formats of PUCCH may exist, depending on the duration of PUCCH and the UCI payload size:

Format #0: Short PUCCH of 1 or 2 symbols with small UCI payloads of up to two bits, with UE multiplexing capacity of up to 6 UEs with 1-bit payload in the same PRB;

Format #1: Long PUCCH of 4-14 symbols with small UCI payloads of up to two bits, with UE multiplexing capacity of up to 84 UEs without frequency hopping and 36 UEs with frequency hopping in the same PRB;

Format #2: Short PUCCH of 1 or 2 symbols with large UCI payloads of more than two bits, with no UE multiplexing capability in the same PRBs;

Format #3: Long PUCCH of 4-14 symbols with large UCI payloads, with no UE multiplexing capability in the same PRBs;

Format #4: Long PUCCH of 4-14 symbols with moderate UCI payloads, with multiplexing capacity of up to 4 UEs in the same PRBs.

The short PUCCH format of up to two UCI bits may be based on sequence selection, while the short PUCCH format of more than two UCI bits may frequency-multiplex UCI and DMRS. The long PUCCH formats may time-multiplex the UCI and DMRS. Frequency hopping may be supported for long PUCCH formats and for short PUCCH formats of duration of two symbols. Long PUCCH formats may be repeated over multiple slots.

For operation with shared spectrum channel access, PUCCH Format #0, #1, #2, and #3 may be extended to use a resource in one PRB interlace (up to two interlaces for Format #2 and Format #3) in one RB Set. PUCCH Format #2 and #3 may be enhanced to support multiplexing capacity of up to four UEs in the same PRB interlace when one interlace is used.

UCI multiplexing in PUSCH may be supported when UCI and PUSCH transmissions coincide in time, either due to transmission of a UL-SCH transport block or due to triggering of aperiodic CSI (A-CSI) transmission without a UL-SCH transport block:

UCI carrying HARQ-ACK feedback with 1 or 2 bits may be multiplexed by puncturing PUSCH;

In all other cases, UCI may be multiplexed by rate matching PUSCH.

The UCI may include the following information:
CSI;
ACK/NAK; and
Scheduling request.

For operation with shared spectrum channel access, multiplexing of CG-UCI and PUCCH carrying HARQ-ACK feedback may be configured by the gNB. If not configured, when PUCCH overlaps with a PUSCH scheduled by a configured grant within a PUCCH group, and PUCCH carries HARQ ACK feedback, PUSCH scheduled by configured grant may be skipped.

QPSK and $\pi/2$ BPSK modulation may be used for long PUCCH with more than two bits of information, QPSK may be used for short PUCCH with more than two bits of information and BPSK and QPSK modulation may be used for long PUCCH with up to two information bits.

Transform precoding may be applied to PUCCH Format #3 and Format #4.

Channel coding used for UCI may be as described in Table 2:

TABLE 2

| Uplink Control Information size including CRC, if present | Channel code |
|---|---|
| 1 | Repetition code |
| 2 | Simplex code |
| 3-11 | Reed Muller code |
| >11 | Polar code |

Uplink Random Access

Random access preamble sequences of four different lengths may be supported. Sequence length 839 may be applied with subcarrier spacings of 1.25 and 5 kHz, sequence length 139 may be applied with subcarrier spacings of 15, 30, 60, and 120 kHz, and sequence lengths of 571 and 1151 may be applied with subcarrier spacings of 30 kHz and 15 kHz, respectively. Sequence length 839 may support unrestricted sets and restricted sets of Type A and Type B, while sequence lengths 139, 571, and 1151 may support unrestricted sets only. Sequence length 839 may only be used for operation with licensed channel access while sequence length 139 may be used for operation with either licensed or shared spectrum channel access. Sequence lengths of 571 and 1151 may be used only for operation with shared spectrum channel access.

Multiple Physical Random Access Channel (PRACH) preamble formats are defined with one or more PRACH OFDM symbols, along with different cyclic prefix and guard time. The PRACH preamble configuration to use may be provided to the UE in the system information.

For IAB, additional random-access configurations are defined. These configurations may be obtained by extending the random-access configurations defined for UEs via scaling the periodicity and/or offsetting the time domain position of the Random Access Channel (RACH) occasions.

IAB Mobile Terminations (IAB-MTs) may be provided with random access configurations (as defined for UEs or after applying the aforementioned scaling/offsetting) different from random access configurations provided to UEs.

The UE may calculate the PRACH transmit power for the retransmission of the preamble based on the most recent estimate pathloss and a power ramping counter.

The system information may provide information for the UE to determine the association between the SSB and the RACH resources. The RSRP threshold for SSB selection for RACH resource association may be configurable by network.

Uplink Link Adaptation

Four types of link adaptation may be supported as follows:
Adaptive transmission bandwidth;
Adaptive transmission duration;
Transmission power control; and
Adaptive modulation and channel coding rate.

For channel state estimation purposes, the UE may be configured to transmit an SRS that the gNB may use to estimate the uplink channel state and may use the estimate in link adaptation.

Uplink Power Control

The gNB may determine the desired uplink transmit power and may provide uplink transmit power control commands to the UE. The UE may use the provided uplink transmit power control commands to adjust its transmit power.

Uplink HARQ

Asynchronous Incremental Redundancy HARQ may be supported. The gNB may schedule each uplink transmission and retransmission using the uplink grant on DCI. For operation with shared spectrum channel access, UE may also retransmit on configured grants.

The UE may be configured to transmit code block group-based transmissions where retransmissions may be scheduled to carry a subset of all the code blocks of a TB.

Up to two HARQ-ACK codebooks corresponding to a priority (high/low) may be constructed simultaneously. For each HARQ-ACK codebook, more than one PUCCH for HARQ-ACK transmission within a slot may be supported. Each PUCCH may be limited within one sub-slot, and the sub-slot pattern may be configured per HARQ-ACK codebook.

Prioritization of Overlapping Transmissions

PUSCH and PUCCH may be associated with a priority (high/low) by RRC or L1 signalling. If a PUCCH transmission overlaps in time with a transmission of a PUSCH or another PUCCH, only the PUCCH or PUSCH associated with a high priority may be transmitted.

Uplink Reference Signals and Measurements for Positioning

Periodic, semipersistent, and aperiodic transmission may be employed for gNB UL Relative Time of Arrival (RTOA), UL SRS-RSRP, and UL Angle of Arrival (UL-AoA) measurements to facilitate support of UL TDOA and UL-AoA positioning methods.

Periodic, semipersistent, and aperiodic transmission of SRS for positioning may be employed for gNB UL RTOA, UL SRS-RSRP, UL-AoA, and gNB RX-TX time difference measurements to facilitate support of UL TDOA, UL-AoA, and multi-RTT positioning methods (e.g., as described in TS 38.305).

Carrier Aggregation (CA)

In Carrier Aggregation (CA), two or more Component Carriers (CCs) may be aggregated. A UE may simultaneously receive or transmit on one or multiple CCs depending on its capabilities:

A UE with single timing advance capability for CA may simultaneously receive and/or transmit on multiple CCs corresponding to multiple serving cells sharing the same timing advance (e.g., multiple serving cells grouped in one Time Alignment Group (TAG));

A UE with multiple timing advance capability for CA may simultaneously receive and/or transmit on multiple CCs corresponding to multiple serving cells with different timing advances (e.g., multiple serving cells grouped in multiple TAGs). NG-RAN may ensure that each TAG contains at least one serving cell; and A non-CA capable UE may receive on a single CC and transmit on a single CC corresponding to one serving cell only (e.g., one serving cell in one TAG).

CA may be supported for both contiguous and non-contiguous CCs. When CA is deployed, frame timing and System Frame Number (SFN) may be aligned across cells that can be aggregated, or an offset in multiples of slots between the Primary Cell (PCell)/Primary Secondary Cell (PSCell) and a Secondary Cell (SCell) may be configured to the UE. The maximum number of configured CCs for a UE may be 16 for DL and 16 for UL.

Supplementary Uplink (SUL)

In conjunction with a UL/DL carrier pair (e.g., in a Frequency Division Duplexing (FDD) band) or a bidirectional carrier (e.g., in a Time Division Duplexing (TDD) band), a UE may be configured with a Supplementary Uplink (SUL). SUL differs from the aggregated uplink in that the UE may be scheduled to transmit either on the SUL or on the UL of the carrier being supplemented, but not on both at the same time.

DL and UL Bandwidth Part (BWP) Operation

As indicated in 3GPP TS 38.300 Rel-16 and/or 3GPP TS 38.321 Rel-16, a Serving Cell may be configured with one or multiple BWPs, up to a maximum number of BWPs per Serving Cell (e.g., as specified in TS 38.213).

The BWP switching for a Serving Cell may be used to activate an inactive BWP and deactivate an active BWP at a time. The BWP switching may be controlled by the PDCCH indicating a downlink assignment or an uplink grant, by the bwp-InactivityTimer, by RRC signalling, or by the MAC entity itself upon initiation of a Random Access procedure or upon detection of consistent Listen Before Talk (LBT) failure on a Special Cell (SpCell). Upon RRC (re-) configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively (e.g., as specified in TS 38.331) may be active without receiving PDCCH indicating a downlink assignment or an uplink grant. The active BWP for a Serving Cell may be indicated by either RRC or PDCCH (e.g., as specified in TS 38.213). For unpaired spectrum, a DL BWP may be paired with a UL BWP, and BWP switching may be common for both UL and DL.

For each SCell, a dormant BWP may be configured with dormantDownlinkBWP-Id by RRC signalling (e.g., as described in TS 38.331). Entering or leaving a dormant BWP for SCells may be done by BWP switching per SCell or per dormancy SCell group based on instruction from PDCCH (e.g., as specified in TS 38.213). The dormancy SCell group configurations may be configured by RRC signalling (e.g., as described in TS 38.331). Upon reception of the PDCCH indicating leaving dormant BWP, the DL BWP indicated by firstOutsideActiveTimeBWP-Id or by firstWithinActiveTimeBWP-Id (e.g., as specified in TS 38.331 and TS 38.213) may be activated. Upon reception of the PDCCH indicating entering dormant BWP, the DL BWP indicated by dormantDownlinkBWP-Id (e.g., as specified in TS 38.331) may be activated. The dormant BWP configuration for SpCell or PUCCH SCell may not be supported.

For each activated Serving Cell configured with a BWP, the MAC entity may operate as follows (where each leading number below indicates a corresponding logic level):
1> if a BWP is activated and the active DL BWP for the Serving Cell is not the dormant BWP:
 2> transmit on UL-SCH on the BWP;
 2> transmit on RACH on the BWP, if PRACH occasions are configured;
 2> monitor the PDCCH on the BWP;
 2> transmit PUCCH on the BWP, if configured;
 2> report CSI for the BWP;
 2> transmit SRS on the BWP, if configured;
 2> receive DL-SCH on the BWP; and
 2> (re-)initialize any suspended configured uplink grants of configured grant Type 1 on the active BWP according to the stored configuration, if any, and to start in the symbol;
 2> if consistent LBT failure recovery is configured:
  3> stop the lbt-FailureDetectionTimer, if running;
  3> set LBT_COUNTER to 0; and
  3> monitor LBT failure indications from lower layers.
1> if a BWP is activated and the active DL BWP for the Serving Cell is dormant BWP:
 2> stop the bwp-InactivityTimer of this Serving Cell, if running.
 2> do not monitor the PDCCH on the BWP;
 2> do not monitor the PDCCH for the BWP;
 2> do not receive DL-SCH on the BWP;
 2> perform periodic or semi-persistent CSI measurement for the BWP, if configured;
 2> do not transmit SRS on the BWP;
 2> do not transmit on UL-SCH on the BWP;
 2> do not transmit PUCCH on the BWP.
 2> clear any configured downlink assignment and any configured uplink grant Type 2 associated with the SCell respectively;
 2> suspend any configured uplink grant Type 1 associated with the SCell; and
 2> if configured, perform beam failure detection and beam failure recovery for the SCell if beam failure is detected.
1> if a BWP is deactivated:
 2> do not transmit on UL-SCH on the BWP;
 2> do not transmit on RACH on the BWP;
 2> do not monitor the PDCCH on the BWP;
 2> do not transmit PUCCH on the BWP;
 2> do not report CSI for the BWP;
 2> do not transmit SRS on the BWP;
 2> not receive DL-SCH on the BWP;
 2> clear any configured downlink assignment and configured uplink grant of configured grant Type 2 on the BWP; and
 2> suspend any configured uplink grant of configured grant Type 1 on the inactive BWP.

Upon initiation of the Random Access procedure on a Serving Cell, after the selection of carrier for performing Random Access procedure, the MAC entity may, for the selected carrier of this Serving Cell, perform the following operations:
1> if PRACH occasions are not configured for the active UL BWP:
 2> switch the active UL BWP to BWP indicated by initialUplinkBWP;
 2> if the Serving Cell is an SpCell:
  3> switch the active DL BWP to BWP indicated by initialDownlinkBWP.
1> else:
 2> if the Serving Cell is an SpCell:
  3> if the active DL BWP does not have the same bwp-Id as the active UL BWP:
   4> switch the active DL BWP to the DL BWP with the same bwp-Id as the active UL BWP.
1> stop the bwp-InactivityTimer associated with the active DL BWP of this Serving Cell, if running.
1> if the Serving Cell is SCell:
 2> stop the bwp-InactivityTimer associated with the active DL BWP of SpCell, if running; and.
1> perform the Random Access procedure on the active DL BWP of SpCell and active UL BWP of this Serving Cell.

If the MAC entity receives a PDCCH for BWP switching of a Serving Cell, the MAC entity may perform operations as follows:
1> if there is no ongoing Random Access procedure associated with this Serving Cell; or
1> if the ongoing Random Access procedure associated with this Serving Cell is successfully completed upon reception of this PDCCH addressed to a Cell Radio Network Temporary Identifier (C-RNTI):
 2> cancel, if any, triggered consistent LBT failure for this Serving Cell; and
 2> perform BWP switching to a BWP indicated by the PDCCH.

If the MAC entity receives a PDCCH for BWP switching for a Serving Cell(s) or a dormancy SCell group(s) while a Random Access procedure associated with that Serving Cell is ongoing in the MAC entity, it may be up to UE implementation whether to switch BWP or ignore the PDCCH for BWP switching, except for the PDCCH reception for BWP switching addressed to the C-RNTI for successful Random Access procedure completion, in which case the UE may perform BWP switching to a BWP indicated by the PDCCH. Upon reception of the PDCCH for BWP switching other than successful contention resolution, if the MAC entity decides to perform BWP switching, the MAC entity may stop the ongoing Random Access procedure and initiate a Random Access procedure after performing the BWP switching; if the MAC decides to ignore the PDCCH for BWP switching, the MAC entity may continue with the ongoing Random Access procedure on the Serving Cell.

Upon reception of RRC (re-)configuration for BWP switching for a Serving Cell while a Random Access procedure associated with that Serving Cell is ongoing in the MAC entity, the MAC entity may stop the ongoing Random Access procedure and initiate a Random Access procedure after performing the BWP switching.

Upon reception of RRC (re-)configuration for BWP switching for a Serving Cell, any triggered LBT failure in this Serving Cell may be canceled.

The MAC entity may, for each activated Serving Cell configured with bwp-InactivityTimer, perform the following operations:
1> if the defaultDownlinkBWP-Id is configured, and the active DL BWP is not the BWP indicated by the defaultDownlinkBWP-Id, and the active DL BWP is not the BWP indicated by the dormantDownlinkBWP-Id if configured; or
1> if the defaultDownlinkBWP-Id is not configured, and the active DL BWP is not the initialDownlinkBWP, and the active DL BWP is not the BWP indicated by the dormantDownlinkBWP-Id if configured:
  2> if a PDCCH addressed to C-RNTI or CS-RNTI indicating downlink assignment or uplink grant is received on the active BWP; or
  2> if a PDCCH addressed to C-RNTI or CS-RNTI indicating downlink assignment or uplink grant is received for the active BWP; or
  2> if a MAC PDU is transmitted in a configured uplink grant and LBT failure indication is not received from lower layers; or
  2> if a MAC PDU is received in a configured downlink assignment:
    3> if there is no ongoing Random Access procedure associated with this Serving Cell; or
    3> if the ongoing Random Access procedure associated with this Serving Cell is successfully completed upon reception of this PDCCH addressed to C-RNTI:
      4> start or restart the bwp-InactivityTimer associated with the active DL BWP.
  2> if the bwp-InactivityTimer associated with the active DL BWP expires:
    3> if the defaultDownlinkBWP-Id is configured:
      4> perform BWP switching to a BWP indicated by the defaultDownlinkBWP-Id.
    3> else:
      4> perform BWP switching to the initialDownlinkBWP.

NOTE: If a Random Access procedure is initiated on an SCell, both this SCell and the SpCell may be associated with this Random Access procedure.
1> if a PDCCH for BWP switching is received, and the MAC entity switches the active DL BWP:
  2> if the defaultDownlinkBWP-Id is configured, and the MAC entity switches to the DL BWP which is not indicated by the defaultDownlinkBWP-Id and is not indicated by the dormantDownlinkBWP-Id if configured; or
  2> if the defaultDownlinkBWP-Id is not configured, and the MAC entity switches to the DL BWP which is not the initialDownlinkBWP and is not indicated by the dormantDownlinkBWP-Id if configured:
    3> start or restart the bwp-InactivityTimer associated with the active DL BWP.

Activation/Deactivation of UE-Specific PDSCH TCI State

The network may activate and deactivate the configured TCI states for PDSCH of a Serving Cell or a set of Serving Cells configured in simultaneousTCI-UpdateList1-r16 or simultaneousTCI-UpdateList2-r16 by sending the TCI States Activation/Deactivation for UE-specific PDSCH MAC CE. The network may activate and deactivate the configured TCI states for a codepoint of the DCI Transmission configuration indication field (e.g., as specified in TS 38.212) for PDSCH of a Serving Cell by sending the Enhanced TCI States Activation/Deactivation for UE-specific PDSCH MAC CE. The configured TCI states for PDSCH may be initially deactivated upon configuration and after a handover.

The MAC entity may perform the following operations:
1> if the MAC entity receives a TCI States Activation/Deactivation for UE-specific PDSCH MAC CE on a Serving Cell:
  2> indicate to lower layers the information regarding the TCI States Activation/Deactivation for UE-specific PDSCH MAC CE.
1> if the MAC entity receives an Enhanced TCI States Activation/Deactivation for UE-specific PDSCH MAC CE on a Serving Cell:
  2> indicate to lower layers the information regarding the Enhanced TCI States Activation/Deactivation for UE-specific PDSCH MAC CE.

Indication of TCI State for UE-Specific PDCCH

The network may indicate a TCI state for PDCCH reception for a CORESET of a Serving Cell or a set of Serving Cells configured in simultaneousTCI-UpdateList1-r16 or simultaneousTCI-UpdateList2-r16 by sending the TCI State Indication for UE-specific PDCCH MAC CE.

The MAC entity may perform the following operations:
1> if the MAC entity receives a TCI State Indication for UE-specific PDCCH MAC CE on a Serving Cell:
  2> indicate to lower layers the information regarding the TCI State Indication for UE-specific PDCCH MAC CE.

Activation/Deactivation of Spatial Relation of PUCCH Resource

The network may activate and deactivate a spatial relation for a PUCCH resource of a Serving Cell by sending the PUCCH spatial relation Activation/Deactivation MAC-CE. The network may also activate and deactivate a spatial relation for a PUCCH resource or a PUCCH resource group of a Serving Cell by sending the Enhanced PUCCH spatial relation Activation/Deactivation MAC-CE.

The MAC entity may perform the following operations:
1> if the MAC entity receives a PUCCH spatial relation Activation/Deactivation MAC-CE on a Serving Cell:
  2> indicate to lower layers the information regarding the PUCCH spatial relation Activation/Deactivation MAC-CE.
1> if the MAC entity receives an Enhanced PUCCH spatial relation Activation/Deactivation MAC-CE on a Serving Cell:
  2> indicate to lower layers the information regarding the Enhanced PUCCH spatial relation Activation/Deactivation MAC-CE.

PUCCH Spatial Relation Activation/Deactivation MAC-CE

Figure 4:
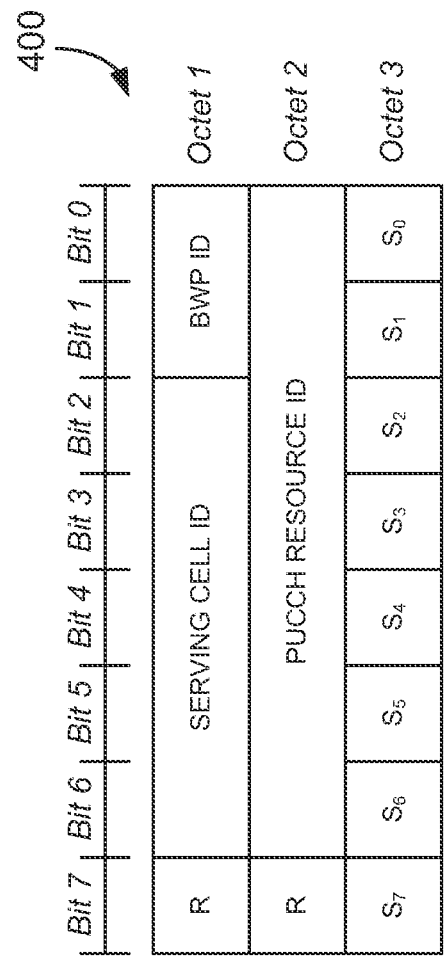
FIG. 4 is a diagram illustrating a PUCCH Spatial Relation Activation/Deactivation Medium Access Control-Control Element (MAC-CE), according to an example implementation of the present application.

FIG. 4 is a diagram illustrating a PUCCH spatial relation activation/deactivation Medium Access Control-Control Element (MAC-CE) 400, according to an example implementation of the present application. As depicted, PUCCH spatial relation activation/deactivation MAC-CE 400 may be identified by a MAC subheader with Logical Channel ID (LCID), and may have a fixed size of 24 bits, with the following fields:

Serving Cell ID: This field indicates the identity of the Serving Cell for which the MAC CE applies. The length of the field is 5 bits.

BWP ID: This field indicates a UL BWP for which the MAC CE applies as the codepoint of the DCI bandwidth part indicator field (e.g., as specified in TS 38.212). The length of the BWP ID field is 2 bits.

PUCCH Resource ID: This field contains an identifier of the PUCCH resource ID identified by PUCCH-ResourceId (e.g., as specified in TS 38.331). The length of the field is 7 bits.

$S_i$: If, in PUCCH-Config in which the PUCCH Resource ID is configured, there is a PUCCH Spatial Relation Info with PUCCH-SpatialRelationInfoId (e.g., as specified in TS 38.331), configured for the uplink bandwidth part indicated by BWP ID field, $S_i$ indicates the activation status of PUCCH Spatial Relation Info with PUCCH-SpatialRelationInfoId equal to i+1; otherwise, MAC entity shall ignore this field. The $S_i$ field is set to 1 to indicate PUCCH Spatial Relation Info with PUCCH-SpatialRelationInfoId equal to i+1 shall be activated. The $S_i$ field is set to 0 to indicate PUCCH Spatial Relation Info with PUCCH-SpatialRelationInfoId equal to i+1 shall be deactivated. Only a single PUCCH Spatial Relation Info can be active for a PUCCH Resource at a time.

R: Reserved bit (e.g., set to 0).

Enhanced PUCCH Spatial Relation Activation/Deactivation MAC-CE

Figure 5:
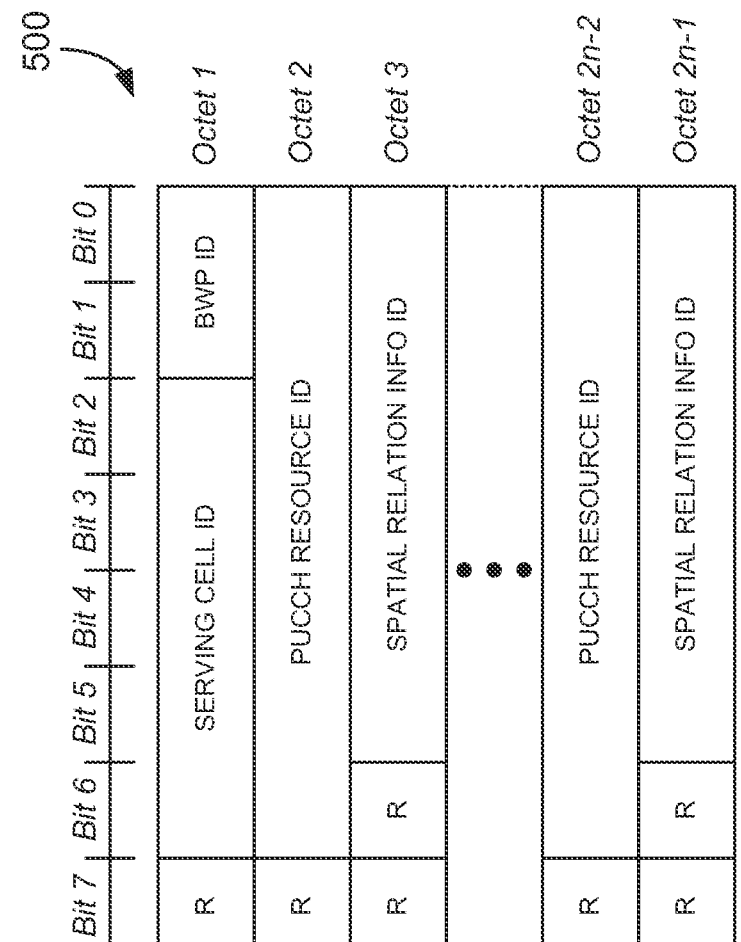
FIG. 5 is a diagram illustrating an Enhanced PUCCH Spatial Relation Activation/Deactivation MAC-CE, according to an example implementation of the present application.

FIG. 5 is a diagram illustrating an Enhanced PUCCH Spatial Relation Activation/Deactivation MAC-CE 500, according to an example implementation of the present application. As depicted in FIG. 5, the Enhanced PUCCH Spatial Relation Activation/Deactivation MAC-CE may be identified by a MAC subheader with eLCID, and may have a variable size with the following fields:

Serving Cell ID: This field indicates the identity of the Serving Cell for which the MAC-CE applies. The length of the field is 5 bits.

BWP ID: This field indicates a UL BWP for which the MAC-CE applies as the codepoint of the DCI BWP indicator field (e.g., as specified in TS 38.212). The length of the BWP ID field is 2 bits.

PUCCH Resource ID: This field contains an identifier of the PUCCH resource ID identified by PUCCH-ResourceId (e.g., as specified in TS 38.331). The length of the field is 7 bits. If the indicated PUCCH Resource is configured as part of a PUCCH Group (e.g., as specified in TS 38.331), no other PUCCH Resources within the same PUCCH group are indicated in the MAC-CE, and this MAC-CE applies to all the PUCCH Resources in the PUCCH group.

Spatial Relation Info ID: This field contains an identifier of the PUCCH Spatial Relation Info ID identified by PUCCH-SpatialRelationInfoId, in PUCCH-Config in which the PUCCH Resource ID is configured (e.g., as specified in TS 38.331). The length of the field is 6 bits.

R: Reserved bit (e.g., set to 0).

UE States and State Transitions Including Inter-Radio Access Technology (InterRAT)

Figure 6:
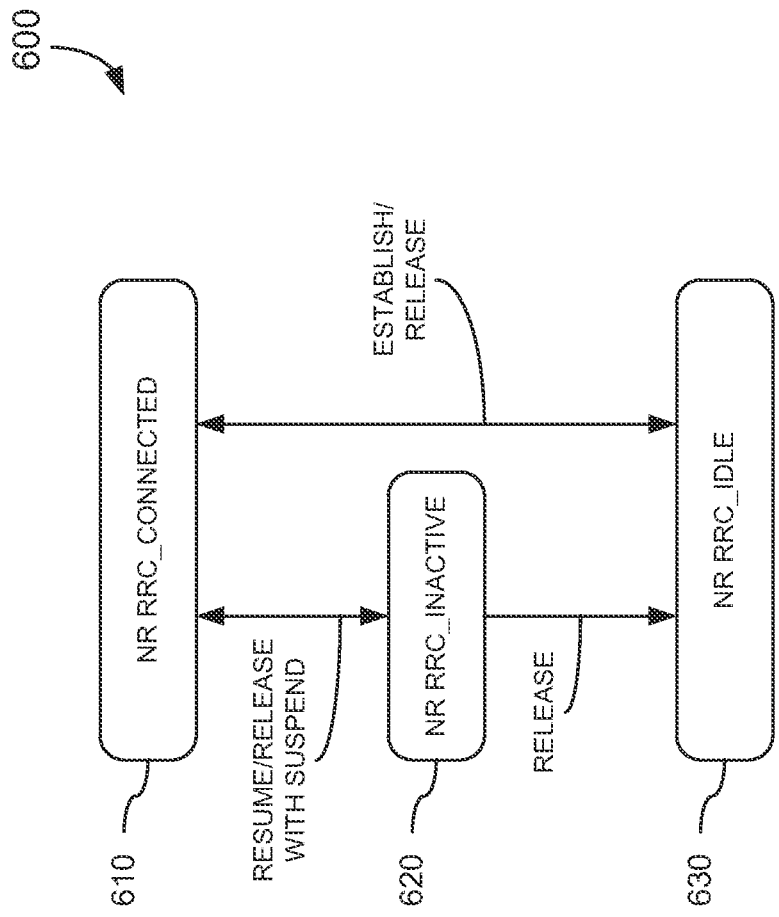
FIG. 6 is a state transition diagram illustrating a UE state machine and associated state transitions in NR, according to an example implementation of the present application.

FIG. 6 is an RRC state transition diagram 600 illustrating various RRC states and RRC transition procedures that a UE may undergo within a next generation radio access network, according to an example implementation of the present application. The RRC state transition diagram 600 may include NR RRC_CONNECTED state 610, NR RRC_INACTIVE state 620, and NR RRC_IDLE state 630. In some implementations, the RRC states 610, 620, and 630 may be independent of one another, and the UE may reside in only one RRC state 610, 620, and 630 at any particular time. As shown in FIG. 6, and as indicated in 3GPP TS 38.331 Rel-16, a UE may transition among the three RRC states 610, 620, and 630. Further, in some implementations, A UE may be either in NR RRC_CONNECTED state 610 or in NR RRC_INACTIVE state 620 when an RRC connection has been established. If this is not the case (i.e., no RRC connection is established), the UE is in NR RRC_IDLE state 630.

FIG. 7 is a state transition diagram 700 illustrating a UE state machine and associated state transitions in NR and E-UTRA networks, according to an example implementation of the present application. As depicted in FIG. 7, state transition diagram 700 includes the three states of FIG. 6 (i.e., NR RRC_CONNECTED state 610, NR RRC_INACTIVE state 620, and NR RRC_IDLE state 630), along with their associated state transitions. Additionally, state transition diagram 700 includes three corresponding states associated with E-UTRA operations (e.g., an EUTRA RRC_CONNECTED state 710, an EUTRA RRC_INACTIVE state 720, and an EUTRA RRC_IDLE state 730), along with state transitions corresponding to those associated with states 610, 620, and 630. For example, a release procedure may be employed to transition the UE from EUTRA RRC_CONNECTED state 710 or EUTRA RRC_INACTIVE state 720 to EUTRA RRC_IDLE state 730. Other transitions discussed above in association with states 610, 620, and 630 of FIG. 6 (e.g., transitions resulting from an establish procedure, a resume procedure, a release with suspend procedure, and so on) are also applicable to states 610, 620, and 630, as well as corresponding states 710, 720, and 730 of FIG. 7.

FIGS. 8-13 provide computer program listings representing various Information Elements (IEs) of interest that may be transmitted between the UE and the network in some aspects of the present implementations. For example, FIG. 8 is a diagram illustrating a Bandwidth Part Uplink Dedicated (BWP-UplinkDedicated) IE 800, according to an example implementation of the present application. In some implementations, BWP-UplinkDedicated IE 800 may be employed to configure UE-specific parameters of a UL BWP.

FIG. 9 is a diagram illustrating a Control Resource Set (ControlResourceSet) IE 900, according to an example implementation of the present application. In some implementations, ControlResourceSet IE 900 may be employed to configure a time/frequency Control Resource Set (CORESET) in which to search for DCI (e.g., as set forth in TS 38.213).

FIGS. 10A-10D are diagrams illustrating a PUCCH Configuration (PUCCH-Config) IE 1000A-1000D, according to an example implementation of the present application. In some implementations, PUCCH-Config IE 1000A-1000D may be employed to configure UE-specific PUCCH parameters (e.g., per BWP).

FIG. 11 is a diagram illustrating a PUCCH Spatial Relation Information (PUCCH-SpatialRelationInfo) IE 1100, according to an example implementation of the present application. In some implementations, PUCCH-SpatialRelationInfo IE 1100 may be employed to configure the spatial settings for PUCCH transmission and the parameters for PUCCH power control (e.g., as indicated in TS 38.213, clause 9.2.2). More specifically, as depicted in FIG. 11, PUCCH-SpatialRelationInfo IE 1100 includes several fields of interest, such as pucch-PathlossReferenceRS-Id, pucch-SpatialRelationInfoId, and servingCellId, as well as a conditional field SetupOnly. In some implementations, when the pucch-PathLossReferenceRS-Id-v1610 field is configured, the UE may ignore the pucch-PathlossReferenceRS-Id field. Similarly, when the pucch-SpatialRelationInfold-v1610 field is configured, the UE may ignore the pucch-SpatialRelationInfold field. Additionally, when the servingCellId field is absent, the UE may apply the ServCellId value of the serving cell in which the PUCCH-SpatialRelationInfold field (also shown in FIG. 11) is configured. Additionally, the presence of the conditional field SetupOnly may be mandatory upon creation of PUCCH-SpatialRelationInfo IE 1100.

FIGS. 12A-12G are diagrams illustrating a Sounding Reference Signal (SRS) Configuration (SRS-Config) IE 1200A-1200G, according to an example implementation of the present application. In some implementations, SRS-Config IE 1200A-1200G may be employed to configure SRS transmissions or to configure SRS measurements for Cross Link Interference (CLI). The configuration may define a list of SRS-Resources and a list of SRS-ResourceSets. Each resource set defines a set of SRS-Resources, as indicated in SRS-Config IE 1200A-1200G. The network may trigger the transmission of the set of SRS-Resources using a configured aperiodicSRS-ResourceTrigger field (e.g., Layer-1 DCI), as shown in FIG. 12B.

FIG. 13 is a diagram illustrating a Transmission Configuration Indicator (TCI) State (TCI-State) IE 1300, according to an example implementation of the present application. In some implementations, TCI-State IE 1300 may associate one or two DL reference signals with a corresponding Quasi-Colocation (QCL) type (e.g., qcl-Type1 and qcl-Type2, as shown in FIG. 13). Within TCI-State IE 1300, the bwp-Id field may indicate the DL BWP in which the Reference Signal (RS) is located. The referenceSignal field may indicate the RS with which QCL information is provided (e.g., as specified in TS 38.214, subclause 5.1.5). The cell field of TCI-State IE 1300 may indicate the UE's serving cell in which the referenceSignal is configured. If the field is absent, cell may apply to the serving cell in which TCI-State IE 1300 is configured. The RS may be located on a serving cell other than the serving cell in which TCI-State IE 1300 is configured only if the qcl-Type field is configured as typeC or typeD (e.g., as indicated in TS 38.214, subclause 5.1.5). (The qcl-Type field may be specified as indicated in TS 38.214, subclause 5.1.5.) The CSI-RS-Indicated field of TCI-State IE 1300 may be present if the csi-rs field is included; otherwise, the CSI-RS-Indicated field may be absent.

Downlink Control Information (DCI)

As indicated in 3GPP TS 38.211 Rel-16 and TS 38.212 Rel-16, a DCI may transport Downlink Control Information (DCI) for one or more cells with one Radio Network Temporary Identifier (RNTI). Several coding steps may be involved in generating the DCI, including IE multiplexing, CRC attachment, channel coding, and rate matching.

DCI Formats

Potential supported DCI formats may include those listed in Table 3, below.

TABLE 3

| DCI format | Usage |
| --- | --- |
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |

TABLE 3-continued

| DCI format | Usage |
| --- | --- |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause 9.3.1 of TS 38.473 |
| 2_6 | Notifying the power saving information outside DRX Active Time for one or more UEs |
| 3_0 | Scheduling of NR sidelink in one cell |
| 3_1 | Scheduling of LTE sidelink in one cell |

The fields defined in the DCI formats above may be mapped to the information bits $a_0$ to $a_{A-1}$. Each field may be mapped in the order in which it appears in the description, including the zero-padding bit(s), if any, with the first field mapped to the lowest order information bit $a_0$ and each successive field mapped to higher order information bits. The most significant bit of each field may be mapped to the lowest order information bit for that field (e.g., the most significant bit of the first field is mapped to $a_0$). If the number of information bits in a DCI format is less than 12 bits, zeros may be appended to the DCI format until the payload size equals 12. The size of each DCI format may be determined by the configuration of the corresponding active bandwidth part of the scheduled cell and may be adjusted.

UCI Reporting in PUCCH

UCI types reported in a PUCCH may include HARQ-ACK information, Scheduling Request (SR), Link Recovery Request (LRR), and Channel State Information (CSI). UCI bits may include HARQ-ACK information bits, if any, SR information bits, if any, LRR information bit, if any, and CSI bits, if any. The HARQ-ACK information bits may correspond to a HARQ-ACK codebook. For the remainder of this discussion, any reference to SR is applicable for SR and/or for LRR.

In some implementations, for $N_{PUCCH}^{repeat} > 1$,

The UE repeats the PUCCH transmission with the UCI over $N_{PUCCH}^{repeat}$ slots;

A PUCCH transmission in each of the $N_{PUCCH}^{repeat}$ slots has a same number of consecutive symbols, as provided by nrofSymbols in PUCCH-format1, nrofSymbols in PUCCH-format3, or nrofSymbols in PUCCH-format4;

A PUCCH transmission in each of the $N_{PUCCH}^{repeat}$ slots has a same first symbol, as provided by startingSymbolIndex in PUCCH-format1, startingSymbolIndex in PUCCH-format3, or startingSymbolIndex in PUCCH-format4;

The UE is configured by interslotFrequencyHopping whether or not to perform frequency hopping for PUCCH transmissions in different slots;

If the UE is configured to perform frequency hopping for PUCCH transmissions across different slots,
  the UE performs frequency hopping per slot;
  the UE transmits the PUCCH starting from a first PRB, provided by startingPRB, in slots with even number and starting from the second PRB, provided by secondHopPRB, in slots with odd number. The slot indicated to the UE for the first PUCCH transmission has number 0 and each subsequent slot until the UE transmits the PUCCH in $N_{PUCCH}^{repeat}$ slots is counted regardless of whether or not the UE transmits the PUCCH in the slot; and the UE does not expect to be configured to perform frequency hopping for a PUCCH transmission within a slot; and If the UE is not configured to perform frequency hopping for PUCCH transmissions across different slots and if the UE is configured to perform frequency hopping for PUCCH transmissions within a slot, the frequency hopping pattern between the first PRB and the second PRB is same within each slot.

If the UE determines that, for a PUCCH transmission in a slot, the number of symbols available for the PUCCH transmission is smaller than the value provided by nrofSymbols for the corresponding PUCCH format, the UE may not transmit the PUCCH in the slot.

A SS/PBCH block symbol is a symbol of an SS/PBCH block with candidate SS/PBCH block index corresponding to the SS/PBCH block index indicated to a UE by ssb-PositionsIBurst in SIB1 or ssb-PositionsIBurst in ServingCellConfigCommon.

For unpaired spectrum, the UE may determine the $N_{PUCCH}^{repeat}$ slots for a PUCCH transmission starting from a slot indicated to the UE and having (1) a UL symbol or flexible symbol that is not SS/PBCH block symbol provided by startingSymbolIndex in PUCCH-format1, or in PUCCH-format3, or in PUCCH-format4 as a first symbol, and (2) consecutive UL symbols or flexible symbols that are not SS/PBCH block symbols, starting from the first symbol, equal to or larger than a number of symbols provided by nrofsymbols in PUCCH-format1, or in PUCCH-format3, or in PUCCH-format4.

For paired spectrum, the UE may determine the $N_{PUCCH}^{repeat}$ slots for a PUCCH transmission as the $N_{PUCCH}^{repeat}$ consecutive slots starting from a slot indicated to the UE.

If a UE would transmit a PUCCH over a first number $N_{PUCCH}^{repeat}>1$ of slots and the UE would transmit a PUSCH with repetition Type A over a second number of slots, and the PUCCH transmission would overlap with the PUSCH transmission in one or more slots, and the conditions for multiplexing the UCI in the PUSCH are satisfied in the overlapping slots, the UE may transmit the PUCCH and may not transmit the PUSCH in the overlapping slots.

If a UE would transmit a PUCCH over a first number $N_{PUCCH}^{repeat}>1$ of slots and the UE would transmit a PUSCH with repetition Type B over a second number of slots, and the PUCCH transmission would overlap with actual PUSCH repetitions in one or more slots, and the conditions for multiplexing the UCI in the PUSCH are satisfied for the overlapping actual PUSCH repetitions, the UE may transmit the PUCCH and may not transmit the overlapping actual PUSCH repetitions.

A UE may not multiplex different UCI types in a PUCCH transmission with repetitions over $N_{PUCCH}^{repeat}>1$ slots. If a UE would transmit a first PUCCH over more than one slot and at least a second PUCCH over one or more slots, and the transmissions of the first PUCCH and the second PUCCH would overlap in a number of slots, then, for each slot of the number of slots and with UCI type priority of HARQ-ACK>SR>CSI with higher priority>CSI with lower priority, (1) the UE may not expect the first PUCCH and any of the second PUCCHs to start at a same slot and include a UCI type with same priority, (2) if the first PUCCH and any of the second PUCCHs include a UCI type with same priority, the UE may transmit the PUCCH starting at an earlier slot and may not transmit the PUCCH starting at a later slot, and (3) if the first PUCCH and any of the second PUCCHs do not include a UCI type with same priority, the UE may transmit the PUCCH that includes the UCI type with higher priority and may not transmit the PUCCH that include the UCI type with lower priority.

A UE may not expect a PUCCH that is in response to a DCI format detection to overlap with any other PUCCH that does not satisfy corresponding timing conditions.

UE Procedure for Determining Physical Downlink Control Channel (PDCCH) Assignment For each DL BWP configured to a UE in a serving cell, the UE can be provided by higher layer signalling with (1) P≤3 CORESETs if CORESETPoolIndex is not provided, or if a value of CORESETPoolIndex is same for all CORESETs if CORESETPoolIndex is provided, and (2) P≤5 CORESETs if CORESETPoolIndex is not provided for a first CORESET, or is provided and has a value 0 for a first CORESET, and is provided and has a value 1 for a second CORESET.

In some implementations, for each CORESET, the UE may be provided the following by ControlResourceSet:
a CORESET index p, by controlResourceSetId, where
0<p<12 if CORESETPoolIndex is not provided, or if a value of CORESETPoolIndex is same for all CORESETs if CORESETPoolIndex is provided;
0<p<16 if CORESETPoolIndex is not provided for a first CORESET, or is provided and has a value 0 for a first CORESET, and is provided and has a value 1 for a second CORESET;
a DM-RS scrambling sequence initialization value by pdcch-DMRS-ScramblingID;
a precoder granularity for a number of REGs in the frequency domain where the UE can assume use of a same DM-RS precoder by precoderGranularity;
a number of consecutive symbols provided by duration;
a set of resource blocks provided by frequencyDomainResources;
CCE-to-REG mapping parameters provided by cce-REG-MappingType;
an antenna port quasi co-location, from a set of antenna port quasi co-locations provided by TCI-State, indicating quasi co-location information of the DM-RS antenna port for PDCCH reception in a respective CORESET;
if the UE is provided by simultaneousTCI-UpdateList-r16 or simultaneousTCI-UpdateListSecond-r16 up to two lists of cells for simultaneous TCI state activation, the UE applies the antenna port quasi co-location provided by TCI-States with same activated tci-StateID value to CORESETs with index p in all configured DL BWPs of all configured cells in a list determined from a serving cell index provided by a MAC CE command
an indication for a presence or absence of a transmission configuration indication (TCI) field for a DCI format, other than DCI format 1_0, that schedules PDSCH receptions or indicates SPS PDSCH release and is transmitted by a PDCCH in CORESET p, by tci-PresentInDCI or tci-PresentInDCI-ForDCIFormat1_2.

Antenna Ports Quasi Co-Location (QCL)

In some implementations, as indicated in 3GPP TS 38.214 Rel-16, the UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State may contain parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship may be configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS may be given by the higher layer parameter qcl-Type in QCL-Info and may take one of the following values: (1) 'QCL-TypeA' (Doppler shift, Doppler spread, average delay, delay spread), (2) 'QCL-TypeB' (Doppler shift, Doppler spread), (3) 'QCL-TypeC' (Doppler shift, average delay), or (4) 'QCL-TypeD' (Spatial Rx parameter).

The UE may receive an activation command (e.g., as described in clause 6.1.3.14 of TS 38.321), used to map up to 8 TCI states to the codepoints of the DCI field 'Transmission Configuration Indication' in one CC/DL BWP or in a set of CCs/DL BWPs, respectively. When a set of TCI state IDs are activated for a set of CCs/DL BWPs, where the applicable list of CCs is determined by indicated CC in the activation command, the same set of TCI state IDs may be applied for all DL BWPs in the indicated CCs.

When a UE supports two TCI states in a codepoint of the DCI field 'Transmission Configuration Indication' the UE may receive an activation command (e.g., as described in clause 6.1.3.24 of TS 38.321), the activation command may be used to map up to 8 combinations of one or two TCI states to the codepoints of the DCI field 'Transmission Configuration Indication'. The UE may not be expected to receive more than 8 TCI states in the activation command.

When the UE would transmit a PUCCH with HARQ-ACK information in slot n corresponding to the PDSCH carrying the activation command, the indicated mapping between TCI states and codepoints of the DCI field 'Transmission Configuration Indication' may be applied starting from the first slot that is after slot $n+3N_{slot}^{subframe,\mu}$ where m is the SCS configuration for the PUCCH. If tci-PresentInDCI is set to "enabled" or tci-PresentInDCI-ForFormat1_2 is configured for the CORESET scheduling the PDSCH, and the time offset between the reception of the DL DCI and the corresponding PDSCH is equal to or greater than timeDurationForQCL, if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to 'QCL-TypeA', and when applicable, also with respect to 'QCL-TypeD'.

If a UE is configured with the higher layer parameter tci-PresentInDCI that is set as 'enabled' for the CORESET scheduling the PDSCH, the UE may assume that the TCI field is present in the DCI format 1_1 of the PDCCH transmitted on the CORESET. If a UE is configured with the higher layer parameter tci-PresentInDCI-ForFormat1_2 for the CORESET scheduling the PDSCH, the UE may assume that the TCI field with a DCI field size indicated by tci-PresentInDCI-ForFormat1_2 is present in the DCI format 1_2 of the PDCCH transmitted on the CORESET. If the PDSCH is scheduled by a DCI format not having the TCI field present, and the time offset between the reception of the DL DCI and the corresponding PDSCH is equal to or greater than a threshold timeDurationForQCL, if applicable, where the threshold is based on reported UE capability (e.g., as indicated in TS 38.306), for determining PDSCH antenna port quasi co-location, the UE may assume that the TCI state or the QCL assumption for the PDSCH is identical to the TCI state or QCL assumption, whichever is applied for the CORESET used for the PDCCH transmission.

If the PDSCH is scheduled by a DCI format having the TCI field present, the TCI field in DCI in the scheduling component carrier may point to the activated TCI states in the scheduled component carrier or DL BWP, the UE may use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability (e.g., as indicated in TS 38.306). When the UE is configured with a single slot PDSCH, the indicated TCI state may be based on the activated TCI states in the slot with the scheduled PDSCH. When the UE is configured with a multi-slot PDSCH, the indicated TCI state may be based on the activated TCI states in the first slot with the scheduled PDSCH, and the UE may expect the activated TCI states are the same across the slots with the scheduled PDSCH. When the UE is configured with CORESET associated with a search space set for cross-carrier scheduling and the UE is not configured with enableDefaultBeamForCSS, the UE may expect tci-PresentInDCI to be set as 'enabled' or tci-PresentInDCI-ForFormat1_2 may be configured for the CORESET, and if one or more of the TCI states configured for the serving cell scheduled by the search space set contains 'QCL-TypeD', the UE may expect the time offset between the reception of the detected PDCCH in the search space set and the corresponding PDSCH is larger than or equal to the threshold timeDurationForQCL.

Independent of the configuration of tci-PresentInDCI and tci-PresentInDCI-ForFormat1_2 in RRC connected mode, if the offset between the reception of the DL DCI and the corresponding PDSCH is less than the threshold timeDurationForQCL, the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the 'QCL-TypeD' of the PDSCH DM-RS is different from that of the PDCCH DM-RS with which they overlap in at least one symbol, the UE may be expected to prioritize the reception of PDCCH associated with that CORESET. This also applies to the intra-band CA case (when PDSCH and the CORESET are in different component carriers). If none of configured TCI states for the serving cell of scheduled PDSCH contains 'QCL-TypeD', the UE may obtain the other QCL assumptions from the indicated TCI states for its scheduled PDSCH irrespective of the time offset between the reception of the DL DCI and the corresponding PDSCH. If a UE is configured with enableDefaultTCIStatePerCoresetPoolIndex and the UE is configured by higher layer parameter PDCCH-Config that contains two different values of CORESETPoolIndex in ControlResourceSet, for both cases, when tci-PresentInDCI is set to 'enabled' and tci-PresentInDCI is not configured in RRC connected mode, if the offset between the reception of the DL DCI and the corresponding PDSCH is less than the threshold timeDurationForQCL, the UE may assume that the DM-RS ports of PDSCH associated with a value of CORESETPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE. When a UE is configured with enableTwoDefaultTCIStates, if the offset between the reception of the DL DCI and the corresponding PDSCH or the first PDSCH transmission occasion is less than the threshold timeDurationForQCL and at least one configured TCI states for the serving cell of scheduled PDSCH contains the 'QCL-TypeD', and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme-r16 set to 'TDMSchemeA' or is configured with higher layer parameter repetitionNumber-r16, the mapping of the TCI states to PDSCH transmission occasions may be determined by replacing the indicated TCI states with the TCI states corresponding to the lowest codepoint among the TCI codepoints containing two different TCI states.

If the PDCCH carrying the scheduling DCI is received on one component carrier, and the PDSCH scheduled by that DCI is on another component carrier and the UE is configured with [enableDefaultBeamForCCS], (1) the timeDurationForQCL may be determined based on the subcarrier spacing of the scheduled PDSCH. If $\mu_{PDCCH} < \mu_{PDSCH}$, an additional timing delay $$d \frac{2^{\mu_{PDSCH}}}{2^{\mu_{PDCCH}}}$$

may be added to the timeDurationForQCL, otherwise d may be zero; and (2) for both the cases, when the offset between the reception of the DL DCI and the corresponding PDSCH is less than the threshold timeDurationForQCL, and when the DL DCI does not have the TCI field present, the UE may obtain its QCL assumption for the scheduled PDSCH from the activated TCI state with the lowest ID applicable to PDSCH in the active BWP of the scheduled cell.

For a periodic CSI-RS resource in a NZP-CSI-ResourceSet configured with higher layer parameter trs-Info, the UE may expect that a TCI-State indicates one of the following quasi co-location type(s): (1) 'QCL-TypeC' with an SS/PBCH block and, when applicable, 'QCL-TypeD' with the same SS/PBCH block, or (2) 'QCL-TypeC' with an SS/PBCH block and, when applicable, 'QCL-TypeD' with a CSI-RS resource in an NZP-CSI-RS-ResourceSet configured with higher layer parameter repetition. For an aperiodic CSI-RS resource in a NZP-CSI-RS-ResourceSet configured with higher layer parameter trs-Info, the UE may expect that a TCI-State indicates 'QCL-TypeA' with a periodic CSI-RS resource in a NZP-CSI-RS-ResourceSet configured with higher layer parameter trs-Info and, when applicable, 'QCL-TypeD' with the same periodic CSI-RS resource.

For a CSI-RS resource in a NZP-CSI-RS-ResourceSet configured without higher layer parameter trs-Info and without the higher layer parameter repetition, the UE may expect that a TCI-State indicates one of the following quasi co-location type(s): (1) 'QCL-TypeA' with a CSI-RS resource in a NZP-CSI-RS-ResourceSet configured with higher layer parameter trs-Info and, when applicable, 'QCL-TypeD' with the same CSI-RS resource, or (2) 'QCL-TypeA' with a CSI-RS resource in a NZP-CSI-RS-ResourceSet configured with higher layer parameter trs-Info and, when applicable, 'QCL-TypeD' with an SS/PBCH block, or (3) 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or (4) 'QCL-TypeB' with a CSI-RS resource in a NZP-CSI-RS-ResourceSet configured with higher layer parameter trs-Info when 'QCL-TypeD' is not applicable.

For a CSI-RS resource in a NZP-CSI-RS-ResourceSet configured with higher layer parameter repetition, the UE may expect that a TCI-State indicates one of the following quasi co-location type(s): (1) 'QCL-TypeA' with a CSI-RS resource in a NZP-CSI-RS-ResourceSet configured with higher layer parameter trs-Info and, when applicable, 'QCL-TypeD' with the same CSI-RS resource, or (2) 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or (3) 'QCL-TypeC' with an SS/PBCH block and, when applicable, 'QCL-TypeD' with the same SS/PBCH block.

For the DM-RS of PDCCH, the UE may expect that a TCI-State indicates one of the following quasi co-location type(s): (1) 'QCL-TypeA' with a CSI-RS resource in a NZP-CSI-RS-ResourceSet configured with higher layer parameter trs-Info and, when applicable, 'QCL-TypeD' with the same CSI-RS resource, or (2) 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or (3) 'QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource.

For the DM-RS of PDSCH, the UE may expect that a TCI-State indicates one of the following quasi co-location type(s): (1) 'QCL-TypeA' with a CSI-RS resource in a NZP-CSI-RS-ResourceSet configured with higher layer parameter trs-Info and, when applicable, 'QCL-TypeD' with the same CSI-RS resource, or (2) 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or (3) QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource.

Using Multiple Spatial Relations Involving Multiple TRPs

In the discussion below, the following terminology may be employed, in addition to those terms already described above:

Base Station (BS): A network central unit or a network node in NR that is used to control one or multiple TRPs associated with one or multiple cells. Communication between a BS and TRP(s) may be via fronthaul. A BS may be referred to as central unit (CU), eNB, gNB, or NodeB.

Transmission/Reception Point (TRP): A transmission and reception point that provides network coverage and directly communicates with the UEs. A TRP may be referred to as distributed unit (DU) or network node.

Cell: An area serviced by one or more associated TRPs (e.g., coverage of the cell is composed of coverage of all associated TRPs). One cell may be controlled by one BS, while a BS may be associated with one or more cells. A cell may be referred to as TRP group (TRPG).

Serving Beam: A beam for a UE generated by a network node (e.g., a TRP), which may be used to communicate with the UE (e.g., for transmission and/or reception).

Candidate Beam: A candidate for a serving beam for a UE. A serving beam may or may not be a candidate beam.

As mentioned above, a PUCCH resource is typically transmitted assuming a single TRP scenario, in which a single spatial relation is used over the more than one PUCCH transmission occasions. Hence, the possible benefits of employing multiple TRP operations may not be harvested during a repetition procedure by using legacy repetition procedures. Below are discussed embodiments and associated aspect thereof, in which a PUCCH repetition procedure may be performed under a multiple TRP scenario. For example, one aspect of such embodiments addresses how to determine which spatial relation to apply on a PUCCH transmission occasion among the one or more PUCCH transmission occasions for repetitions.

Figure 14:
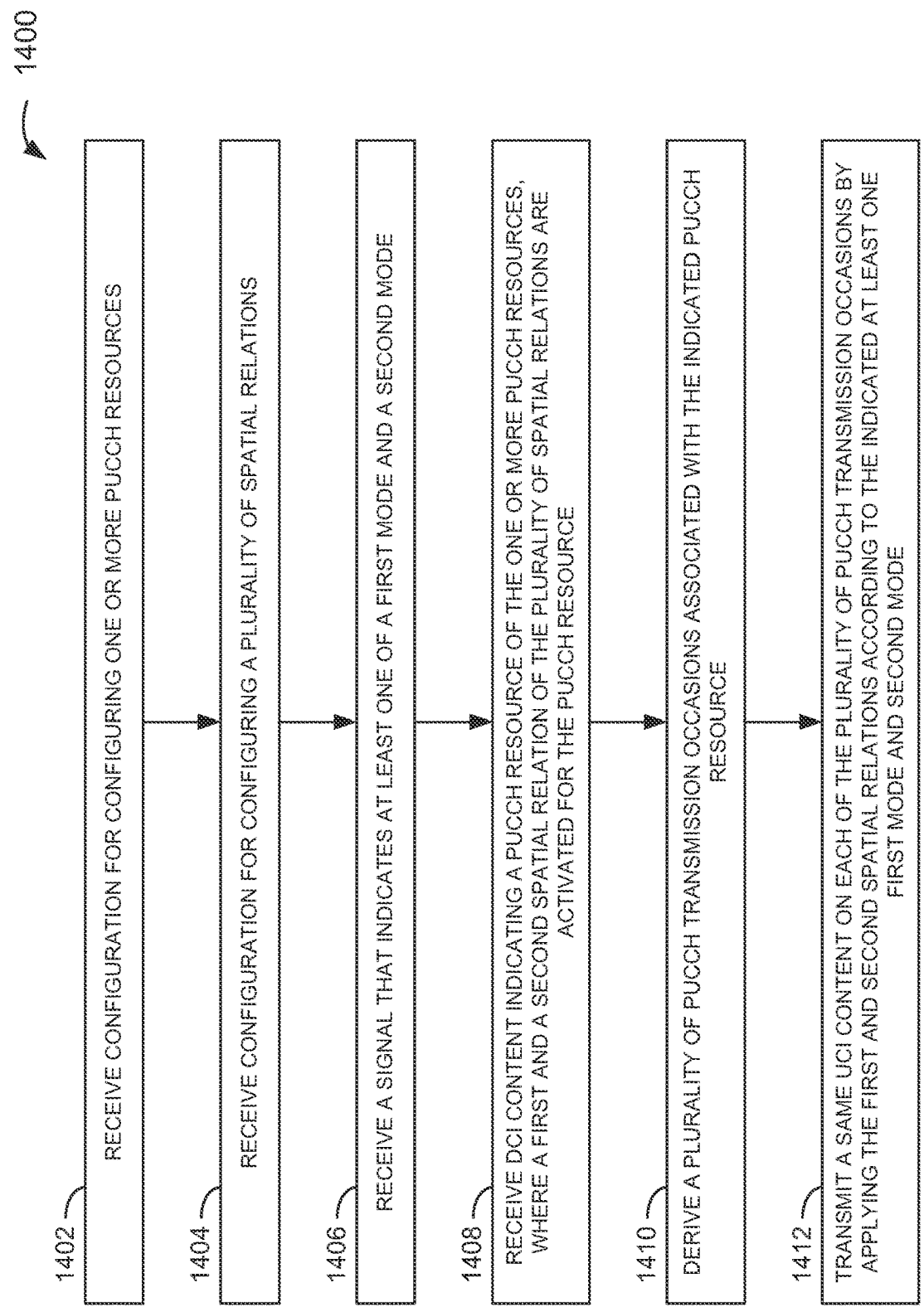
FIG. 14 is a flowchart illustrating a method (or process) performed by a UE to transmit the same UCI content on multiple PUCCH transmission occasions by applying different spatial relations to different PUCCH transmission occasions, according to an example implementation of the present application.

FIG. 14 is a flowchart illustrating a method (or process) 1400 performed by a UE to transmit the same UCI content on multiple PUCCH transmission occasions by applying different spatial relations to different PUCCH transmission occasions, according to an example implementation of the present application. In the method 1400, at operation 1402, a UE may receive a first configuration for configuring one or more PUCCH resources. Also, at operation 1404, the UE may receive a second configuration for configuring a plurality of spatial relations. Additionally, at operation 1406, the UE may receive a signal that indicates at least one of a first mode or a second mode. In some implementations, the first and second modes may be different modes of applying spatial relations to different PUCCH transmission occasions. For example, in some implementations, the first mode may include a sequential mode of application of the spatial relations, while the second mode may include a cyclical mode of application of the spatial relations, as described in greater detail below.

Also in method 1400, at operation 1408, the UE may receive DCI content indicating a PUCCH resource of the one or more PUCCH resources, where a first spatial relation and a second spatial relation of the plurality of spatial relations are activated for the PUCCH resource. At operation 1410, the UE may derive a plurality of PUCCH transmission occasions associated with the indicated PUCCH resource. At operation 1412, the UE may transmit the same UCI content on each of the plurality of PUCCH transmission occasions by applying the first spatial relation and the second spatial relation to the PUCCH transmission occasions according to the indicated mode.

In some embodiments, configuration information may be provided in PUCCH-SpatialRelationInfo (e.g., PUCCH-SpatialRelationInfo IE 1100 of FIG. 11) associated with PUCCH-Config (e.g., PUCCH-Config IE 1000A-1000D of FIGS. 10A-10D). In some such embodiments, a PUCCH resource may be associated with two spatial relations (e.g., two separate beams, such as a first spatial relation and a second spatial relation). In some examples, the UE may receive a Medium Access Control-Control Element (MAC-CE) that indicates two UL beams for the PUCCH resource. In some examples, the UE may receive a MAC-CE that indicates the first UL beam (e.g., for a first UL antenna array or panel) for the PUCCH resource, and the UE may derive the second UL beam (e.g., for a second UL antenna array or panel).

In some implementations, a first PUCCH resource may be configured with at least one spatial relation. Further, the first PUCCH resource may be configured with more than one spatial relation. In some implementations, the first PUCCH resource may be associated with the first spatial relation and the second spatial relation.

In some implementations, the UE may derive a second PUCCH resource from the first PUCCH resource. The second PUCCH resource may be associated with the first PUCCH resource.

In some implementations, the second PUCCH resource (or each PUCCH resource of a second set of PUCCH resources) may be the same as the first PUCCH resource except for being transmitted over other PUCCH transmission occasions among the one or more PUCCH transmission occasions. Also, in some implementations, the second PUCCH resource (or each PUCCH resource of the second set of PUCCH resources) may be the same as the first PUCCH resource except for being transmitted over other PUCCH transmission occasions among the one or more PUCCH transmission occasions and/or being transmitted with a different starting Resource Block (RB) index in the frequency domain.

In some implementations, the UE may transmit the multiple PUCCH resources by applying the first spatial relation and the second spatial relation over the one or more PUCCH transmission occasions. In some implementations, the UE may transmit a first set of PUCCH resources by applying the first spatial relation over some of the one or more PUCCH transmission occasions. Additionally, the UE may transmit a second set of PUCCH resources by applying the second spatial relation over the remaining part of the one or more PUCCH transmission occasions.

In some implementations, the UE may transmit the first set of PUCCH resources by applying the first spatial relation over some of the one or more PUCCH transmission occasions, where the UE may be indicated to do so through some control signaling, such as the RRC signaling. In addition, the UE may transmit the second set of PUCCH resources by applying the second spatial relation over the remaining part of the one or more PUCCH transmission occasions, where the UE is indicated, for example, by the RRC signal to do so.

In some implementations, the first spatial relation may be indicated or activated by a first MAC-CE, and the second spatial relation may be indicated or activated by a second MAC-CE. In some examples, the first MAC-CE and the second MAC-CE may be the same MAC-CE (e.g., a single MAC-CE may be used).

In some implementations, the second spatial relation may only be used when (or if) one or more UCI bits are transmitted using PUCCH repetition. Further, in some implementations, the second spatial relation may only be used to transmit the PUCCH resource, where the one or more UCI bits are transmitted using a PUCCH repetition. Further, in some implementations, the second spatial relation may not be used, when (or if) the one or more UCI bits are not transmitted using a PUCCH repetition. Further, in some implementations, the second spatial relation may not be used to transmit the PUCCH resource, where the one or more UCI bits are not transmitted using a PUCCH repetition. Alternatively, or additionally, the second spatial relation may be indicated or activated by RRC configuration and/or DCI.

In some implementations, the UE may derive the second spatial relation. More particularly, in some examples, the UE may derive the second spatial relation without being explicitly indicated by a MAC-CE. In some implementations, the second spatial relation may be derived from a TCI state or QCL assumption for receiving a DL transmission. The DL transmission may be associated with a second TRP identifier or a second panel identifier. The DL transmission may be a PDSCH associated with the second TRP identifier or the second panel identifier. The DL transmission may be a DL reference signal (e.g., CSI-RS, PTRS, DM-RS, SRS for CLI, PRS) or an SSB associated with the second TRP identifier or the second panel identifier. In some implementations, the DL transmission may be a CORESET, PDCCH, or search space associated with the second TRP identifier or the second panel identifier. The DL transmission may be a CORESET with the lowest CORESET ID (e.g., in the BWP). In some examples, the DL transmission may be a CORESET with the lowest CORESET ID among CORESETs associated with the second TRP identifier or the second panel identifier (e.g., in the BWP). The DL transmission may be a signal, where the signal is a scheduling DCI and/or indicates the PUCCH resource. In some implementations, the DL transmission may be a PDSCH scheduled by a signal, where the signal is a scheduling DCI.

In some implementations, the second spatial relation may be derived from a TCI state from a TCI field codepoint in a DL scheduling DCI for PDSCH reception (e.g., in the BWP). In some implementations, the second spatial relation may be derived from a TCI state from a TCI field codepoint in a UL scheduling DCI for PUSCH transmission (e.g., in the BWP). The TCI field codepoint may indicate or include two TCI states. The TCI field codepoint may be the lowest codepoint among all codepoints in the TCI field, which may indicate or include two TCI states (e.g., a sequential state and a cyclical state). In some implementations, the second spatial relation may be derived from one of the two TCI states indicated by the TCI field codepoint (e.g., the first one or the second one). The TCI field codepoint may indicate or include more than two TCI states.

In some implementations, the second spatial relation may be derived from a spatial relation or spatial filter/parameter for transmitting a UL transmission occasion. It should be noted that in the embodiments described above and below, UL (or DL) transmission occasion, UL (or DL) transmission, and UL (or DL) occasion may all have been used interchangeably.

The UL transmission may be associated with the second TRP identifier or the second panel identifier. The UL transmission may be a PUSCH associated with the second TRP identifier or the second panel identifier. The UL transmission may be a UL reference signal (e.g., SRS, PTRS, DM-RS) or PRACH associated with the second TRP identifier or the second panel identifier. The UL transmission may be a PUCCH resource with the lowest PUCCH resource ID (e.g., in the BWP). The UL transmission may be a PUCCH resource with the lowest PUCCH resource ID among PUCCH resources in the second PUCCH group (e.g., in the BWP).

In some implementations, the UE may determine, or be informed, for a PUCCH transmission occasion among the one or more PUCCH transmission occasions, which spatial relation (e.g., the first spatial relation or the second spatial relation) is to be used to transmit one (or the same) PUCCH resource from the multiple PUCCH resources on the PUCCH transmission occasion.

In some implementations, the UE may determine or be informed which mapping (or mode) of the first spatial relation and/or the second spatial relation to each of the multiple PUCCH resources (to be transmitted over the one or more PUCCH transmission occasions) is to be employed. In some implementations, the mapping of the first spatial relation and/or the second spatial relation to each of the multiple PUCCH resources, to be transmitted over the one or more PUCCH transmission occasions, may be set as "a first mode" or "a second mode". In some implementations, the first mode may be referred to or indicate a "sequential mapping". In some implementations, the second mode may be referred to or indicate a "cyclical mapping". In some implementations, the mapping of the first/second spatial relation, to each of the multiple PUCCH resources (to be transmitted over the one or more PUCCH transmission occasions) may be referred to or replace with the mapping of a first/second spatial TX parameter. In some implementations, the mapping of the first/second spatial relation to each of the multiple PUCCH resources (to be transmitted over the one or more PUCCH transmission occasions) may be referred to or replace with the mapping of a first/second set of UL power control parameters.

Figure 15A:
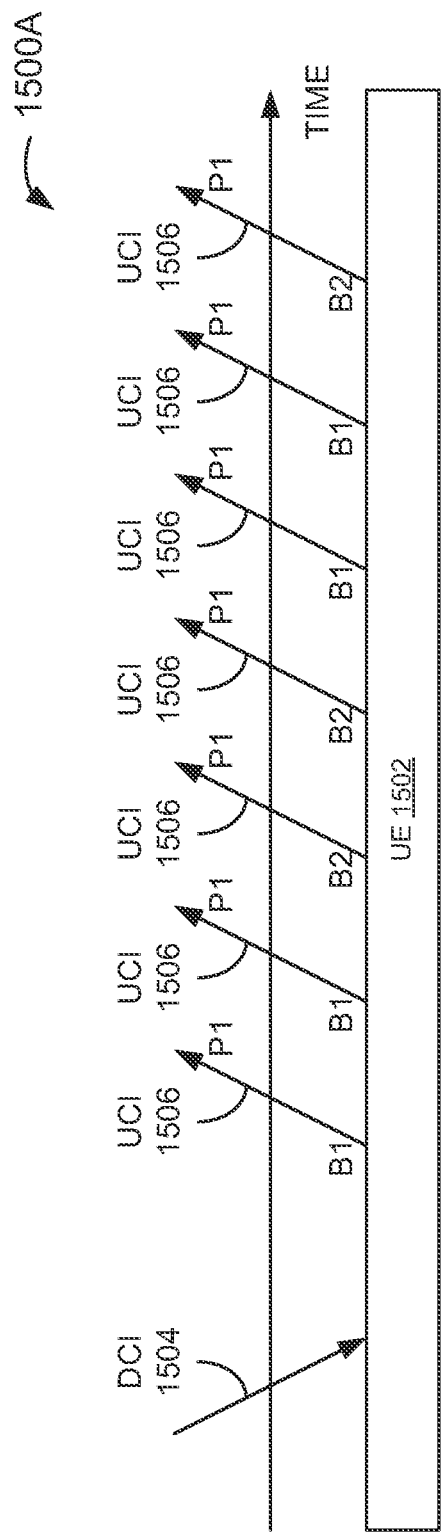
FIGS. 15A and 15B are diagrams illustrating Uplink Control Information (UCI) transmitted over multiple PUCCH occasions using first and second spatial relations based on sequential mappings, according to an example implementation of the present application.
Figure 15B:
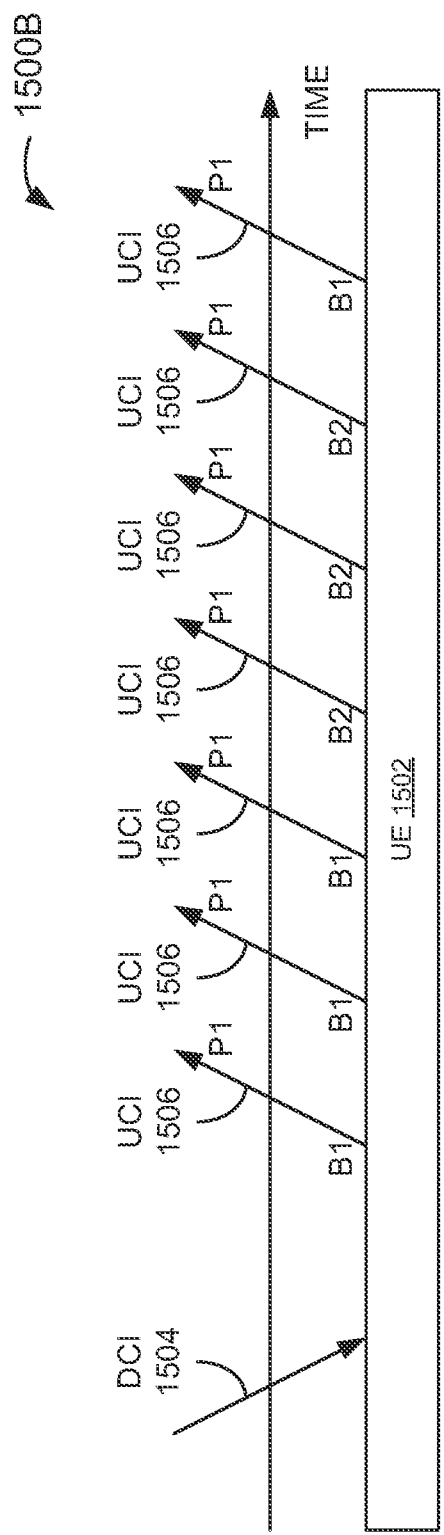
Figure 16:
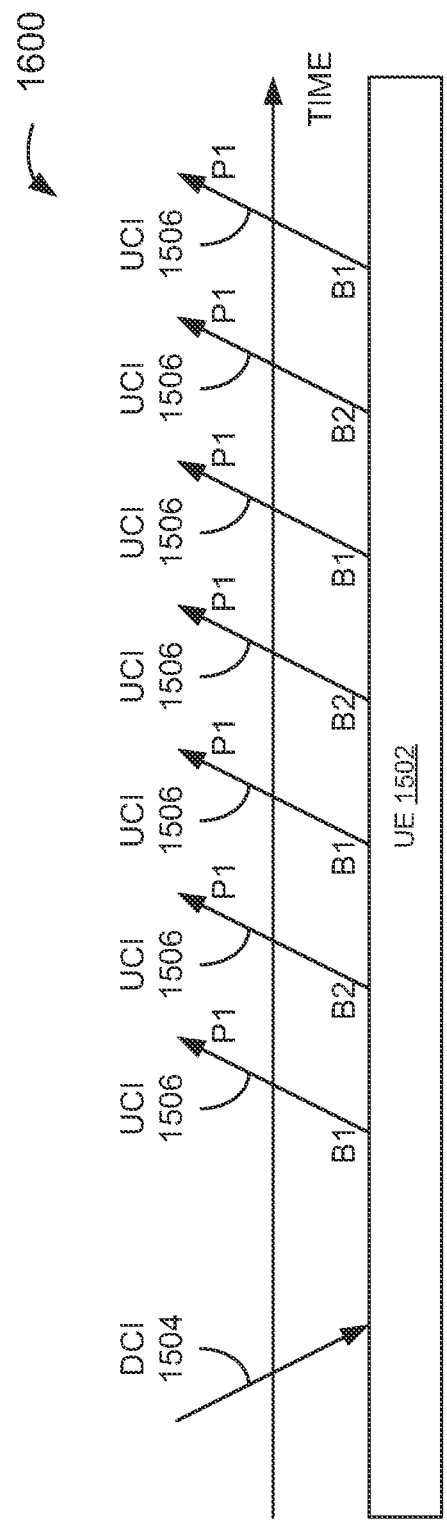
FIG. 16 is a diagram illustrating UCI transmitted over multiple PUCCH occasions using first and second spatial relations based on cyclical mapping, according to an example implementation of the present application.

FIGS. 15A and 15B are diagrams 1500A and 1500B, respectively, illustrating Uplink Control Information (UCI) transmitted over multiple PUCCH transmission occasions using first and second spatial relations based on sequential mappings, according to an example implementation of the present application. FIG. 16 is a diagram illustrating UCI transmitted over multiple PUCCH transmission occasions using first and second spatial relations based on cyclical mapping, according to an example implementation of the present application.

In FIGS. 15A, 15B, and 16, the signal received by a UE 1502 may be a scheduling DCI. In some other aspects of the present implementations, the received signal may be other types of signaling, such as RRC signaling. For cases in which the signal is not a scheduling DCI, the mapping of the first and second spatial relations may be applied as well. In some implementations, a PUCCH resource may be required to be repeatedly transmitted to more than one TRP. In some such implementations, the UE may use a particular spatial relation (e.g., a particular beam) for transmission occasions of the PUCCH resource associated with each TRP. Although two spatial relations (or beams) are shown (e.g., for two TRPs) in the following example figures, it should be noted that more than two spatial relations may be applied to different PUCCH transmission occasions that are sent, for example, to different TRPs.

In the illustrated FIGS. 15A, 15B, and 16, DCI 1504 may include information indicating a PUCCH resource from one or more PUCCH resources for which the first and second spatial relations are activated for the PUCCH resource. Also received by UE 1502 are a first configuration for configuring the one or more PUCCH resources, and a second configuration for configuring the spatial relations. Each spatial relation may include a spatial parameter for UL transmission and a parameter for UL power control. The UE may also receive a signal that indicates a first mode and/or a second mode. In some implementations, the signal may be an RRC parameter.

In response to the information received, the UE may derive a plurality of PUCCH transmission occasions associated with the indicated PUCCH resource. The UE may then transmit the same UCI 1506 content on each of the plurality of PUCCH transmission occasions in accordance with the indicated mode, with each PUCCH transmission occasion carrying UCI 1506 being indicated by a corresponding arrow.

As shown in FIGS. 15A and 15B, each PUCCH transmission occasion is shown as being associated with a corresponding transmission occasion of the same PUCCH resource P1. In addition, each UCI content 1506 transmission (e.g., to a TRP) is also shown as corresponding to either a first spatial relation B1 or a second spatial relation B2. For example, as shown in FIGS. 15A and 15B, a sequential mapping may be performed such that each spatial relation is employed a number of times in sequence. In FIG. 15A, for example, each spatial relation is employed twice consecutively, as in (B1, B1, B2, B2, B1, . . . ), while in FIG. 15B, each spatial relation is employed thrice consecutively, as in (B1, B1, B1, B2, B2, B2, B1, . . . ). Other numbers of consecutive use of a particular spatial relation may be employed in other embodiments.

In other implementations, the mapping of the first spatial relation or the second spatial relation to each of the one or more PUCCH transmission occasions of a PUCCH resource may be set as "cyclical mapping". FIG. 16 is a diagram illustrating UCI content 1506 transmitted over multiple PUCCH transmission occasions of PUCCH resource P1 (e.g., to two different TRPs) using first and second spatial relations based on cyclical mapping, according to an example implementation of the present application. As illustrated in FIG. 16, cyclical mapping may be performed as (B1, B2, B1, B2, . . . ), where each spatial relation B1 or B2 may be employed once, in turn, for each successive PUCCH transmission occasion.

As discussed above, while the embodiments discussed herein focus on the use of two spatial relations B1 and B2, additional spatial relations (e.g., B3, B4, etc.) may be employed using the same types of mappings in other embodiments.

In some implementations, presuming the use of two spatial relations (e.g., the first spatial relation B1 and the second spatial relation B2), a combination of the mode and the total number of a plurality of PUCCH transmission occasions for transmitting UCI content 1506 may determine how the first spatial relation B1 and the second spatial relation B2 may be employed. For example, when the total number of PUCCH transmission occasions is greater than two and the selected mode is the first mode (e.g., a sequential mode), the first spatial relation B1 may be applied to the (4*N+1)-th and (4*N+2)-th PUCCH transmission occasions, and the second spatial relation B2 may be applied to the (4*N+3)-th and (4*N+4)-th PUCCH transmission occasions, where N may be an integer equal to, or greater than, zero. For example, for N=0, the first spatial relation B1 may be applied to the first and second PUCCH transmission occurrences, and the second spatial relation B2 may be applied to the third and fourth PUCCH transmission occurrences. Similarly, for N=1, the first spatial relation B1 may be applied to the fifth and sixth PUCCH transmission occurrences, and the second spatial relation B2 may be applied to the seventh and eighth PUCCH transmission occurrences. This pattern may then continue for incrementally increasing values of N, up to the total number of PUCCH transmission occurrences, as depicted in FIG. 15A.

On the other hand, when the total number of PUCCH transmission occasions is equal to two (e.g., regardless of the selected mode), or the total number of PUCCH transmission occasions is greater than two and the selected mode is the second mode (e.g., a cyclical mode), the first spatial relation B1 may be applied to the (2*N+1)-th PUCCH transmission occasions, and the second spatial relation B2 may be applied to the (2*N+2)-th PUCCH transmission occasions. For example, for N=0, the first spatial relation B1 may be applied to the first PUCCH transmission occurrence, and the second spatial relation B2 may be applied to the second PUCCH transmission occurrence. Similarly, for N=1, the first spatial relation B1 may be applied to the third PUCCH transmission occurrence, and the second spatial relation B2 may be applied to the fourth PUCCH transmission occurrence. This pattern may then continue for incrementally increasing values of N, up to the total number of PUCCH transmission occurrences, as depicted in FIG. 16.

In some implementations, the total number of PUCCH transmission occasions or occurrences may be indicated or derived from (scheduling) DCI.

In some embodiments, a UE may be configured with one or more PUCCH resources in a PUCCH-Config IE in a BWP associated with a serving cell. The UE may be configured with a first PUCCH group and a second PUCCH group, each of them including some of the one or more PUCCH resources. PUCCH-SpatialRelationInfo may be configured in the PUCCH-Config IE. A PUCCH resource may be among the one or more PUCCH resources in the BWP.

The UE may transmit the PUCCH resource for reporting one or more UCI bits (e.g., HARQ-ACK bits, and/or CSI bits, and/or SR), where the PUCCH resource may be transmitted (repeatedly) over one or more PUCCH transmission occasions. When the PUCCH resource is transmitted (repeatedly) over one or more PUCCH transmission occasions, the PUCCH resource may be transmitted repeatedly in different time intervals and/or different staring frequency RB indexes, but may still include the same configuration (e.g., configuring parameters, such as symbol length and/or frequency RB number). The one or more PUCCH transmission occasions may be consecutive across (UL) slots and/or within a (UL) slot. The UE may be informed of and/or derive the PUCCH resource by a signal from the network. The signal may be transmitted via a CORESET associated with a first CORESETPoolIndex. The PUCCH resource may be associated with the first PUCCH group. The signal for indicating the PUCCH resource may be a scheduling DCI or an RRC configuration.

As indicated above, the UE may utilize a first spatial relation and a second spatial relation for transmitting the PUCCH resource over the one or more PUCCH transmission occasions. The first spatial relation may be used to transmit some of the one or more PUCCH transmission occasions (e.g., to a first TRP), and the second spatial relation may be used to transmit the remaining portion of the one or more PUCCH transmission occasions (e.g., to a second TRP). The first spatial relation may be associated with a first panel identifier (or a first antenna), and the second spatial relation may be associated with a second panel identifier (or a second antenna).

In some implementations, the UE may receive a MAC-CE indicating the first spatial relation and the second spatial relation for the PUCCH resource, at least for transmitting the PUCCH resource over the one or more PUCCH transmission occasions. In some implementations, the UE may receive a MAC-CE indicating the first spatial relation, where the first spatial relation may be used when transmitting the PUCCH resource over the one or more PUCCH transmission occasions. The UE may then derive the second spatial relation, where the second spatial relation may be used when transmitting the PUCCH resource over more than one PUCCH transmission occasion. In one example, the second spatial relation may be derived from a TCI state or QCL assumption for receiving a DL transmission. The DL transmission may be associated with a second CORESETPoolIndex. The DL transmission may be a CORESET with the lowest CORESET ID among CORESETs associated with a second CORESETPoolIndex. In another example, the second spatial relation may be derived from a spatial relation for transmitting a UL transmission. The UL transmission may be associated with the second panel identifier. The UL transmission may be a PUCCH resource with the lowest PUCCH resource ID among the second PUCCH group.

In some other embodiments, the configuration information may not be provided in PUCCH-SpatialRelationInfo associated with PUCCH-Config, but still associate a PUCCH resource with two spatial relations. Instead, the UE may derive the two spatial relations from default beams for receiving CORESETs with different values of CORESET-PoolIndex.

In some implementations, a first PUCCH resource may not be configured with any spatial relation. However, the first PUCCH resource may be associated with more than one spatial relation and may be associated with the first spatial relation and the second spatial relation.

In some implementations, the UE may derive a second PUCCH resource from the first PUCCH resource. The second PUCCH resource may be associated with the first PUCCH resource.

In some implementations, the second PUCCH resource (or each PUCCH resource of a second set of PUCCH resources) may be the same as the first PUCCH resource except for being transmitted over other PUCCH transmission occasions among the one or more PUCCH transmission occasions. Also, in some implementations, the second PUCCH resource (or each PUCCH resource of the second set of PUCCH resources) may be the same as the first PUCCH resource except for being transmitted over other PUCCH transmission occasions among the one or more PUCCH transmission occasions and/or being transmitted with a different starting Resource Block (RB) index in the frequency domain.

In some implementations, the UE may transmit the multiple PUCCH resources by applying the first spatial relation and the second spatial relation over the one or more PUCCH transmission occasions. In some implementations, the UE may transmit a first set of PUCCH resources by applying the first spatial relation over some of the one or more PUCCH transmission occasions. Additionally, the UE may transmit a second set of PUCCH resources by applying the second spatial relation over the remaining part of the one or more PUCCH transmission occasions.

In some implementations, the UE may transmit the first set of PUCCH resources by applying the first spatial relation over some of the one or more PUCCH transmission occasions, where the UE may be indicated through some control signaling (e.g., through RRC signaling). In addition, the UE may transmit the second set of PUCCH resources by applying the second spatial relation over the remaining part of the one or more PUCCH transmission occasions, where the UE may be indicated (e.g., by control signaling) to do so.

In some implementations, the UE may derive the first spatial relation without being explicitly indicated by a MAC-CE. For example, the first spatial relation may be derived from a TCI state or QCL assumption for receiving a first DL transmission. The first DL transmission may be associated with the first TRP identifier or the first panel identifier. In other examples, the first DL transmission may be a PDSCH associated with the first TRP identifier or the first panel identifier. In some examples, the first DL transmission may be a DL reference signal (e.g., CSI-RS, PTRS, DM-RS, SRS for CLI, PRS) or SSB associated with the first TRP identifier or the first panel identifier. The first DL transmission may be a CORESET, PDCCH, or search space associated with the first TRP identifier or the first panel identifier. For example, the first DL transmission may be a CORESET with the lowest CORESET ID (e.g., in the BWP). The first DL transmission may be a CORESET with the lowest CORESET ID among CORESETs associated with the first TRP identifier or the first panel identifier (e.g., in the BWP). The first DL transmission may be the signal, where the signal is a scheduling DCI and/or indicates the PUCCH resource. In other examples, the first DL transmission may be a PDSCH scheduled by the signal, where the signal is a scheduling DCI.

In some implementations, the first spatial relation may be derived from a TCI state from a TCI field codepoint in a DL scheduling DCI for PDSCH reception (e.g., in the BWP). In other examples, the first spatial relation may be derived from a TCI state from a TCI field codepoint in a UL scheduling DCI for PUSCH transmission (e.g., in the BWP). The TCI field codepoint may indicate or include two TCI states. The TCI field codepoint may be a lowest codepoint among all codepoints in the TCI field, which may indicate or include two TCI states (e.g., a sequential state and a cyclical state). The first spatial relation may be derived from one of the two TCI states indicated by the TCI field codepoint (e.g., the first one or the second one). Further, the TCI field codepoint may indicate or include more than two TCI states.

In some implementations, the first spatial relation may be derived from a spatial relation or spatial filter/parameter for transmitting a first UL transmission. The first UL transmission may be associated with the first TRP identifier or the first panel identifier. The first UL transmission may be a PUSCH associated with the first TRP identifier or the first panel identifier. The first UL transmission may be a UL reference signal (e.g., SRS, PTRS, DM-RS) or PRACH associated with the first TRP identifier or the first panel identifier. The first UL transmission may be a PUCCH resource with the lowest PUCCH resource ID (e.g., in the BWP). The first UL transmission may be a PUCCH resource with the lowest PUCCH resource ID among PUCCH resources in the first PUCCH group (e.g., in the BWP).

In some implementations, the first spatial relation may be indicated or activated by a first MAC-CE. The UE may derive the second spatial relation (e.g., without being explicitly indicated by a MAC-CE. For example, the second spatial relation may be derived from a TCI state or QCL assumption for receiving a second DL transmission. The second DL transmission may be associated with the second TRP identifier or the second panel identifier. The second DL transmission may be a PDSCH associated with the second TRP identifier or the second panel identifier. The second DL transmission may be a DL reference signal (e.g., CSI-RS, PTRS, DM-RS, SRS for CLI, PRS) or SSB associated with the second TRP identifier or the second panel identifier. The second DL transmission may be a CORESET, PDCCH, or search space associated with the second TRP identifier or the second panel identifier. The second DL transmission may be a CORESET with the lowest CORESET ID (e.g., in the BWP). The second DL transmission may be a CORESET with the lowest CORESET ID among CORESETs associated with the second TRP identifier or the second panel identifier (e.g., in the BWP). The second DL transmission may be a signal, where the signal is a scheduling DCI and/or indicates the PUCCH resource. The second DL transmission may be a PDSCH scheduled by the signal, where the signal is a scheduling DCI.

In some implementations, the second spatial relation may be derived from a TCI state from a TCI field codepoint in a DL scheduling DCI for PDSCH reception (e.g., in the BWP). In some implementations, the second spatial relation may be derived from a TCI state from a TCI field codepoint in a UL scheduling DCI for PUSCH transmission (e.g., in the BWP). The TCI field codepoint may indicate or include two TCI states. The TCI field codepoint may be a lowest codepoint among all codepoints in the TCI field, which may indicate or include two TCI states (e.g., a sequential state and a cyclical state). In some implementations, the second spatial relation may be derived from one of the two TCI states indicated by the TCI field codepoint (e.g., the first one or the second one). The TCI field codepoint may indicate or include more than two TCI states.

In some implementations, the second spatial relation may be derived from a spatial relation or spatial filter/parameter for transmitting a second UL transmission. The second UL transmission may be associated with the second TRP identifier or the second panel identifier. The second UL transmission may be a PUSCH associated with the second TRP identifier or the second panel identifier. The second UL transmission may be a UL reference signal (e.g., SRS, PTRS, DM-RS) or PRACH associated with the second TRP identifier or the second panel identifier. The second UL transmission may be a PUCCH resource with the lowest PUCCH resource ID (e.g., in the BWP). The second UL transmission may be a PUCCH resource with the lowest PUCCH resource ID among PUCCH resources in the second PUCCH group (e.g., in the BWP).

In some implementations, the second spatial relation may be indicated or activated by a second MAC-CE. In some examples, the first MAC-CE and the second MAC-CE may be the same MAC-CE (e.g., a single MAC-CE may be used).

In some implementations, the second spatial relation may only be used when (or if) one or more UCI bits are transmitted using a PUCCH repetition. Further, in some implementations, the second spatial relation may only be used to transmit the PUCCH resource, where the one or more UCI bits are transmitted using a PUCCH repetition. Alternatively, or additionally, the second spatial relation may be indicated or activated by RRC configuration and/or DCI.

In some implementations, the UE may determine, or be informed, for a PUCCH transmission occasion among the one or more PUCCH transmission occasions, which spatial relation (e.g., the first spatial relation or the second spatial relation) is to be used to transmit one (or the same) PUCCH resource from the multiple PUCCH resources on the PUCCH transmission occasion.

In some implementations, the UE may determine or be informed which mapping (or mode) of the first spatial relation and/or the second spatial relation to each of the multiple PUCCH resources to be transmitted over the one or more PUCCH transmission occasions is to be employed. In some implementations, the mapping of the first spatial relation and/or the second spatial relation to each of the multiple PUCCH resources to be transmitted over the one or more PUCCH transmission occasions may be set as "sequential mapping" or "cyclical mapping". Examples of such mapping are as described above, in conjunction with FIGS. 15A, 15B, and 16.

While the embodiments discussed above are primarily directed to the transmission of PUCCH resources over a plurality of PUCCH resource transmission occasions using one or more spatial relations, the concepts described above may also be used for other aspects of UL transmission. More specifically, these concepts may be also applicable for determining resources and/or spatial relations for transmitting other types of UL transmission (e.g., PUSCH, PRACH, or SRS) over one or more (consecutive) transmission occasions. In other examples, these concepts may be applied to a UL Phase-Tracking Reference Signal (PTRS), or to a UL positioning signal.

In the embodiments described above, a spatial relation for transmitting a UL resource (e.g., a PUCCH resource) may be referred to or replaced with or may comprise at least one of the following: a UL beam, a UL TCI, a set of one or more UL power control parameters, a spatial transmission filter, a transmission precoder, spatial parameters, and/or spatial relationship.

More particularly regarding the embodiments described above, when the UE transmits multiple PUCCH resources over one or more PUCCH transmission occasions (respectively), and each of the multiple PUCCH resources carries or indicates the same one or more UCI bits, the UE may be repeating the multiple PUCCH transmissions over the one or more PUCCH transmission occasions.

Moreover, when multiple PUCCH resources are transmitted over one or more PUCCH transmission occasions (respectively), the first transmitted (or intended to be transmitted) PUCCH resource among the multiple PUCCH resources may share one or more time-domain characteristics as those of the remaining PUCCH resources (e.g., having the same starting symbol, and/or including the same number of consecutive symbols). Also, the first transmitted (or intended to be transmitted) PUCCH resource among the multiple PUCCH resources may share one or more frequency-domain characteristics as the remaining PUCCH resources (e.g., frequency bandwidth). It could mean frequency domain behaviour of the multiple PUCCH resource transmissions over the one or more PUCCH transmission occasions may be different (e.g., frequency hopping is enabled or used during repetitions).

When multiple PUCCH resources are transmitted over one or more PUCCH transmission occasions (respectively), the first PUCCH resource may share one or more time-domain characteristics as some other PUCCH resources among the one or more PUCCH resources (e.g., having the same starting symbol, and/or including the same number of consecutive symbols). Also, the second PUCCH resource may share one or more time-domain characteristics as some other PUCCH resources among the one or more PUCCH resources (e.g., having the same starting symbol, and/or including the same number of consecutive symbols). Further, the first PUCCH resource may share one or more frequency-domain characteristics as some other PUCCH resources among the multiple PUCCH resources (e.g., frequency bandwidth). Additionally, the second PUCCH resource may share one or more frequency-domain characteristics as some other PUCCH resources among the multiple PUCCH resources (e.g., frequency bandwidth). Also, frequency-domain behaviour of the multiple PUCCH resource transmissions over the one or more PUCCH transmission occasions may be different (e.g., frequency hopping may be enabled or used during repetitions).

As used herein, a "panel" may refer to an antenna (port) group or an antenna (port) set. There may be more than one DL/UL beam associated with one panel. When one transmitting node (UE or NW) is performing a transmission via a panel, only one beam associated with the panel may be used to perform the transmission. For a transmitter comprising more than one panel, (e.g., two panels), a beam may be associated with each of the two panels respectively to perform a transmission.

Also, as employed herein, a TRP identifier may refer to a (candidate) value of a TRP identifier. The first TRP identifier may be a first candidate value of a TRP identifier or a first TRP identifier value. The second TRP identifier may be a second candidate value of a TRP identifier or a second TRP identifier value.

In addition, a panel identifier may refer to a (candidate) value of a panel identifier. The first panel identifier may be a first candidate value of a panel identifier or a first panel identifier value. The second panel identifier may be a second candidate value of a panel identifier or a second panel identifier value.

One or more of the following communication system characteristics may be applicable to the various embodiments described above:

A UE may be configured with and/or served in a serving cell by a network. The UE may be configured with one or more serving cells, which may include the serving cell. The UE may be activated or be indicated to activate one or more serving cells, which may include the serving cell.

The UE may be configured and/or indicated for one or more BWPs. The UE may be indicated and/or configured for a BWP (in the serving cell). The BWP may be activated as or replaced with an active BWP. The BWP may be an active DL BWP, an active UL BWP, an initial BWP, a default BWP, or a dormant BWP.

The UE may perform DL reception from and/or UL transmission to a first TRP and/or a second TRP. The first TRP and/or the second TRP may be located in the serving cell. The second TRP may be located in a neighboring cell. The second TRP may be located in a cell with a Physical Cell ID (PCI) that is different from that of the serving cell.

The UE may include or be equipped with one or more panels. Some or all of the one or more panels may be used or activated for DL reception (e.g., performed at the same time or same time interval). Some or all of the one or more panels may be used or activated for UL transmission (e.g., performed at the same time or same time interval).

The UE may be in an RRC_CONNECTED state, an RRC_INACTIVE state, or an RRC_IDLE state.

The UE may be configured with, be indicated, or derive one or more TRP identifiers. A TRP identifier may be associated with a TRP. A DL transmission associated with a TRP identifier may indicate that the DL transmission may be transmitted from a TRP associated with the TRP identifier. A UL transmission associated with a TRP identifier may indicate that the UL transmission may be transmitted to a TRP associated with the TRP identifier. A TRP identifier may be associated with a CORESETPoolIndex, or a value (candidate) of a CORESETPoolIndex.

the UE may be configured with, be indicated, or derive one or more panel identifiers. A panel identifier may be associated with a panel. A DL transmission associated with a panel identifier may indicate that the DL transmission may be received by a panel associated with the panel identifier. A UL transmission associated with a panel identifier may indicate that the UL transmission may be transmitted by a panel associated with the panel identifier. A panel identifier may be associated with an SRS resource set index, or a value (candidate) of an SRS resource set index.

The UE may be configured with, be indicated, or derive a first TRP identifier, a second TRP identifier, a first panel identifier, and/or a second panel identifier.

The UE may be configured to perform a PUCCH repetition procedure for transmission of some PUCCH resources or for some PUCCH formats. The UE may transmit multiple PUCCH resources over one or more PUCCH transmission occasions (respectively). Each of the multiple PUCCH resources may be transmitted over or mapped with each of the one or more PUCCH transmission occasions. The UE may transmit the multiple PUCCH resources over one or more PUCCH transmission occasions (respectively), when performing a PUCCH repetition procedure. Each of the multiple PUCCH resources may carry or convey the same set of UCI bits. The same set of UCI bits may be carried or conveyed repeatedly via each of the multiple PUCCH resources. The multiple PUCCH resources may include (only) one PUCCH resource. The multiple PUCCH resources may include a first set of PUCCH resources. The multiple PUCCH resources may include a second set of PUCCH resources. The multiple PUCCH resources may be a combination or union of the first set of PUCCH resources and the second set of PUCCH resources.

The one or more PUCCH transmission occasions may be located in (consecutive and/or available) UL slots. The one or more PUCCH transmission occasions may be located within (consecutive and/or available) UL slots. The one or more PUCCH transmission occasions may be located within (consecutive and/or available) UL slots, where some of the UL slots may be across a slot boundary. The one or more PUCCH transmission occasions may occur periodically.

The UE may be configured with a PUCCH configuration (e.g., PUCCH-Config) in the BWP. The UE may be configured with one or more PUCCH resources, where the one or more PUCCH resources are configured in the PUCCH configuration. The UE may be configured with one or more PUCCH group(s). Each of the one or more PUCCH groups may include some of the one or more PUCCH resources. Spatial relations of PUCCH resources in a PUCCH group may be indicated and/or updated by a single MAC-CE.

A PUCCH group, or PUCCH resources in a PUCCH group, may be associated with a TRP identifier. A PUCCH group, or PUCCH resources in a PUCCH group, may be associated with a (same) TRP. A PUCCH group, or PUCCH resources in a PUCCH group, may be transmitted toward a (same) TRP.

A spatial relation, a PUCCH group, or PUCCH resources in a PUCCH group, may be associated with a panel identifier. A spatial relation, a PUCCH group, or PUCCH resources in a PUCCH group, may be associated with a (same) panel. A spatial relation, a PUCCH group, or PUCCH resources in a PUCCH group, may be transmitted using a (same) panel.

All the one or more PUCCH resources in the PUCCH configuration may be configured with (respective) spatial relations. PUCCH-SpatialRelationInfo may be configured in the PUCCH configuration. Some of the one or more PUCCH resources in the PUCCH configuration may be configured with (respective) spatial relations, and others may not.

Alternatively, or additionally, PUCCH-SpatialRelation-Info may not be configured in the PUCCH configuration. Alternatively, or additionally, none of the one or more PUCCH resources in the PUCCH configuration may be configured with (respective) spatial relations.

The UE may be configured with a first PUCCH group and/or a second PUCCH group. PUCCH resources in the first PUCCH group may be different from those in the second PUCCH group. The first PUCCH group may be associated with the first TRP identifier. The second PUCCH group may be associated with the second TRP identifier.

The first PUCCH group may be associated with the first panel identifier. Some or all PUCCH resources in the first PUCCH group may be associated with the first panel identifier. The second PUCCH group may be associated with the second panel identifier. Some or all PUCCH resources in the second PUCCH group may be associated with the second panel identifier.

The UE may be indicated and/or configured to report one or more UCI bits. The one or more UCI bits may be transmitted via the multiple PUCCH resources. The one or more UCI bits may be transmitted via each of the multiple PUCCH resources repeatedly.

The one or more UCI bits may include some or all of the following: one or more SR(s), one or more HARQ-ACK bit(s), one or more CSI bits(s). Some or all of the one or more UCI bits may be associated with a signal. For example, one or more HARQ-ACK bit(s) for a PDSCH scheduled by the signal may be among the one or more UCI bits. One or more CSI bit(s) triggered by the signal may be among the one or more UCI bits. The signal may be a scheduling DCI, a MAC-CE or a RRC configuration. The signal may refer to a first signal in the above description.

The UE may be indicated or configured for a PUCCH resource. The UE may select and/or derive a PUCCH resource. The PUCCH resource may be the first transmitted (intended to be transmitted) PUCCH resource among the multiple PUCCH resources. The PUCCH resource may be the first transmitted (or intended to be transmitted) PUCCH resource among the first set of PUCCH resources. The PUCCH resource may be used for reporting the one or more UCI bits. The PUCCH resource may be transmitted over some or all of the one or more PUCCH transmission occasions. The PUCCH resource may be indicated, configured, or derived from the signal.

The PUCCH resource may be associated with or included in the first PUCCH group. The PUCCH resource may be associated with the first TRP identifier. The PUCCH resource may be associated with the first panel identifier. The PUCCH resource may refer to a first PUCCH resource in the above description.

The PUCCH resource may be among the first set of PUCCH resources. The remaining PUCCH resources in the first set of PUCCH resources may be the same as the first PUCCH resource. The remaining PUCCH resources in the first set of PUCCH resources may be the same as the first PUCCH resource except for being transmitted over other PUCCH transmission occasions among the one or more PUCCH transmission occasions. The remaining PUCCH resources in the first set of PUCCH resources may be the same as the first PUCCH resource except for being transmitted over other PUCCH transmission occasions among the one or more PUCCH transmission occasions and/or being transmitted with a different starting RB index in the frequency domain. The first PUCCH resource may share one or more time-domain characteristics as the remaining PUCCH resources in the first set of PUCCH resources (e.g., having the same starting symbol, and/or including the same number of consecutive symbols). The first PUCCH resource may share one or more frequency-domain characteristics as the remaining PUCCH resources in the first set of PUCCH resources (e.g., frequency bandwidth).

The UE may be indicated or configured a second PUCCH resource. The UE may select and/or derive a second PUCCH resource. The second PUCCH resource may be one of the remaining PUCCH resources among the multiple PUCCH resources (e.g., except for the first PUCCH resource). The second PUCCH resource may be the second, third, or fourth transmitted (or intended to be transmitted) PUCCH resource among the multiple PUCCH resources. The second PUCCH resource may be the first transmitted (or intended to be transmitted) PUCCH resource among the second set of PUCCH resources. The second PUCCH resource may be used for reporting the one or more UCI bits. The second PUCCH resource may be transmitted over some or all of the one or more PUCCH transmission occasions. The second PUCCH resource may be indicated, configured or derived from a second signal. The second signal may be a scheduling DCI, a MAC-CE, or an RRC configuration.

The second PUCCH resource may be associated with or included in the second PUCCH group. The second PUCCH resource may be associated with the second TRP identifier. The second PUCCH resource may be associated with the second panel identifier.

The second PUCCH resource may be among the second set of PUCCH resources. The remaining PUCCH resources in the second set of PUCCH resources may be the same as the second PUCCH resource. The remaining PUCCH resource in the second set of PUCCH resources may be the same as the second PUCCH resource except for being transmitted over other PUCCH transmission occasions among the one or more PUCCH transmission occasions. The remaining PUCCH resources in the second set of PUCCH resources may be the same as the second PUCCH resource except for being transmitted over other PUCCH transmission occasions among the one or more PUCCH transmission occasions and/or being transmitted with different starting RB indexes in the frequency domain. The second PUCCH resource may share one or more time-domain characteristics as the remaining PUCCH resources in the second set of PUCCH resources (e.g., having the same starting symbol, and/or including the same number of consecutive symbols). The second PUCCH resource may share one or more frequency-domain characteristics as the remaining PUCCH resources in the second set of PUCCH resources (e.g., frequency bandwidth).

The UE may be indicated, activated, and/or updated for a first spatial relation. The UE may derive a first spatial relation. The first spatial relation may be associated with the first TRP identifier. The first spatial relation may be associated with the first panel identifier.

The UE may be indicated, activated, and/or updated for a second spatial relation. The UE may derive a second spatial relation. The second spatial relation may be associated with the second TRP identifier. The second spatial relation may be associated with the second panel identifier.

The UE may transmit the first PUCCH resource via the first spatial relation. The UE may transmit the first PUCCH resource via the second spatial relation. The UE may transmit the second PUCCH resource via the first spatial relation. The UE may transmit the second PUCCH resource via the second spatial relation. The UE may transmit the first PUCCH resource via the first spatial relation and transmit the second PUCCH resource via the second spatial relation.

The UE may transmit the first set of PUCCH resources via the first spatial relation. Alternatively, or additionally, the UE may transmit the first set of PUCCH resources via the second spatial relation. The UE may transmit the second set of PUCCH resources via the second spatial relation. Alternatively, or additionally, the UE may transmit the second set of PUCCH resources via the first spatial relation. The UE may transmit the first set of PUCCH resources via the first spatial relation and transmit the second set of PUCCH resources via the second spatial relation.

The first spatial relation may be used for transmitting the first PUCCH resource, regardless of whether the first PUCCH resource is transmitted for PUCCH repetitions. The second spatial relation may (only) be used for transmitting the second PUCCH resource or the second set of PUCCH resources, when (or if) the first PUCCH resource is transmitted over (some of) the one or more PUCCH transmission occasions for PUCCH repetitions, and/or the multiple PUCCH resources include the second PUCCH resource or the second set of PUCCH resources. The second spatial relation may (only) be used for transmitting the second PUCCH resource or the second set of PUCCH resources, where the first PUCCH resource is transmitted over (some of) the one or more PUCCH transmission occasions for PUCCH repetitions, and/or the multiple PUCCH resources comprise the second PUCCH resource or the second set of PUCCH resources.

The signal may be transmitted via a CORESET associated with a first TRP identifier. The signal may be received and/or associated with a first panel identifier. The signal may be transmitted by and/or associated with a first TRP. The signal may be received by and/or associated with a first panel.

The second signal may be transmitted via a CORESET associated with a second TRP identifier. The second signal may be received and/or associated with a second panel identifier. The second signal may be transmitted by and/or associated with a second TRP. The second signal may be received by and/or associated with a second panel.

The UE may expect any of the following to happen when (or if) the UE is indicated to use the first spatial relation and the second spatial relation for the one or more PUCCH transmission occasions: (1) the UE is configured or indicated or able to derive the first TRP identifier and/or the second TRP identifier to be associated with CORESETs in the BWP, and (2) the UE is indicated that at least one TCI field codepoint in a DL scheduling DCI for PDSCH reception in the BWP includes or indicates two TCI states.

The network may not be allowed or may prevent any of the following to happen, when (or if) the UE is indicated to use the first spatial relation and the second spatial relation for the one or more PUCCH transmission occasions: (1) the UE is configured or indicated or able to derive the first TRP identifier and/or the second TRP identifier to be associated with CORESETs in the BWP, and (2) the UE is indicated that at least one TCI field codepoint in a DL scheduling DCI for PDSCH reception in the BWP includes or indicates two TCI states.

The UE may expect any of the following to happen when (or if) the UE is indicated to use the first PUCCH resource and the second PUCCH resource for the one or more PUCCH transmission occasions: (1) the UE is configured or indicated or able to derive the first TRP identifier and/or the second TRP identifier to be associated with CORESETs in the BWP, and (2) the UE is indicated that at least one TCI field codepoint in a DL scheduling DCI for PDSCH reception in the BWP includes or indicates two TCI states.

The network may not be allowed or may prevent any of the following to happen, when (or if) the UE is indicated to use the first PUCCH resource and the second PUCCH resource for the one or more PUCCH transmission occasions: (1) the UE is configured or indicated or able to derive the first TRP identifier and/or the second TRP identifier to be associated with CORESETs in the BWP, and (2) the UE is indicated that at least one TCI field codepoint in a DL scheduling DCI for PDSCH reception in the BWP includes or indicates two TCI states.

The UE may receive an RRC signal. The RRC signal may indicate to the UE whether to use the first spatial relation to transmit the first set of PUCCH resources over some of the one or more PUCCH transmission occasions, and whether to use the second spatial relation to transmit the second set of PUCCH resources over the remaining portion of the one or more PUCCH transmission occasions. The RRC signal may indicate to the UE whether to use the first spatial relation to transmit some of the multiple PUCCH resources over some of the one or more PUCCH transmission occasions, and whether to use the second spatial relation to transmit some of the multiple PUCCH resources over some of the one or more PUCCH transmission occasions. The RRC signal may indicate to the UE whether to derive a second PUCCH resource and/or a second set of PUCCH resources (e.g., for a PUCCH repetition). The RRC signal may indicate to the UE whether there is a second PUCCH resource and/or a second set of PUCCH resources (e.g., for a PUCCH repetition).

Figure 17:
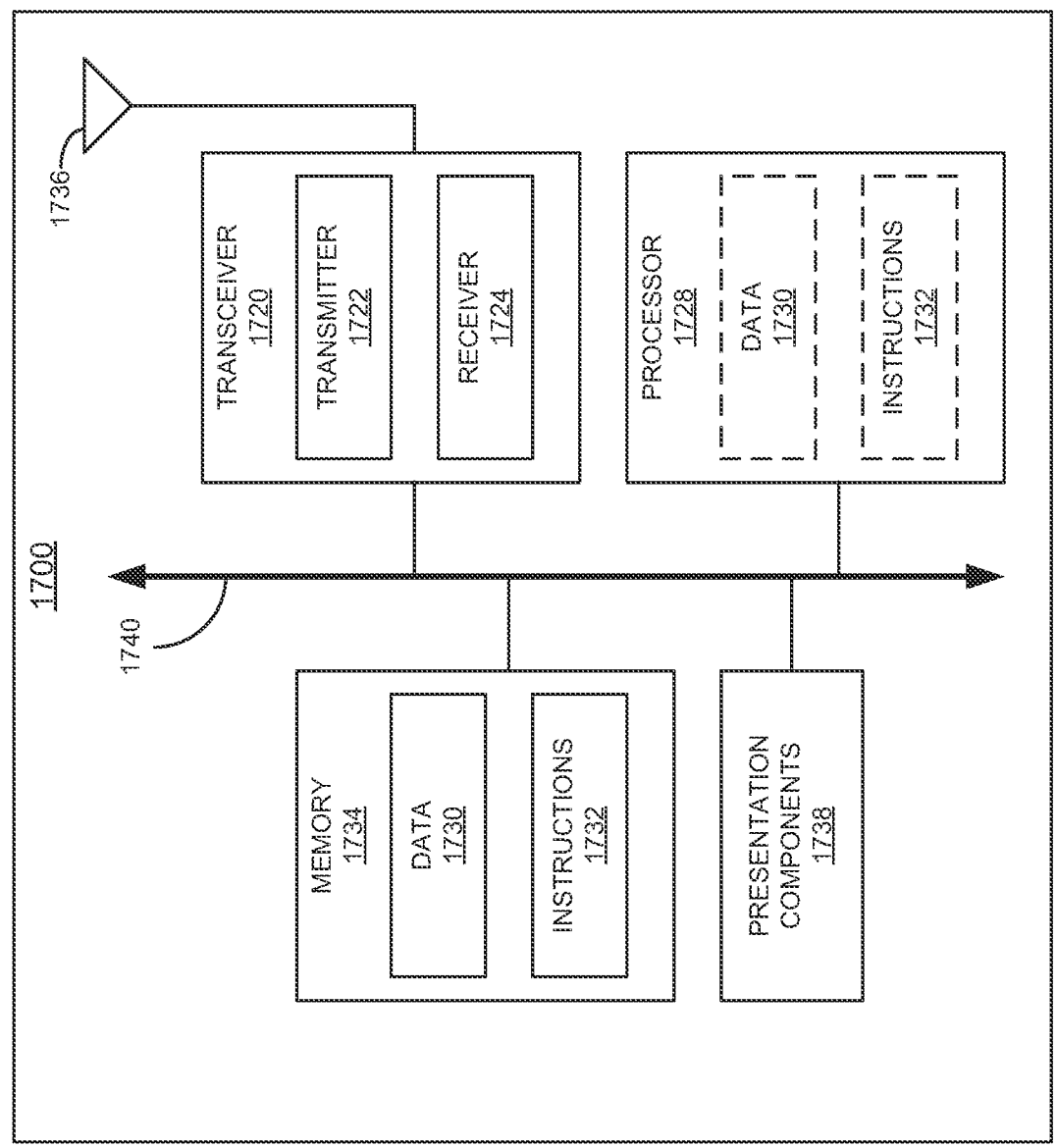
FIG. 17 is a block diagram illustrating a node for wireless communication, according to an example implementation of the present application.

FIG. 17 illustrates a block diagram of a node 1700 for wireless communication, according to one example implementation of the present application. As shown in FIG. 17, node 1700 may include a transceiver 1720, a processor 1728, a memory 1734, one or more presentation components 1738, and at least one antenna 1736. Node 1700 may also include a Radio Frequency (RF) spectrum band module, a base station communications module, a network communications module, and a system communications management module, input/output (I/O) ports, I/O components, and power supply (not explicitly shown in FIG. 17). Each of these components may be in communication with each other, directly or indirectly, over one or more buses 1740.

Transceiver 1720, having a transmitter 1722 (e.g., transmitting/transmission circuitry) and a receiver 1724 (e.g., receiving/reception circuitry), may be configured to transmit and/or receive time and/or frequency resource partitioning information. In some implementations, transceiver 1720 may be configured to transmit in different types of subframes and slots including, but not limited to, usable, non-usable and flexibly usable subframes and slot formats. Transceiver 1720 may be configured to receive data and control channels.

Node 1700 may include a variety of computer-readable media. Computer-readable media can be any available media that can be accessed by node 1700 and include both volatile and non-volatile media, removable and non-removable media. By way of example, and not limitation, computer-readable media may include computer storage media and communication media. Computer storage media include both volatile and non-volatile, removable and non-removable media implemented in any method or technology for storage of information, such as computer-readable instructions, data structures, program modules or other data. Computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio-frequency (RF), infrared, and other wireless media. Combinations of any of the above should also be included within the scope of computer-readable media.

Memory 1734 may include computer-storage media in the form of volatile and/or non-volatile memory. Memory 1734 may be removable, non-removable, or a combination thereof. Exemplary memory includes solid-state memory, hard drives, optical-disc drives, etc. As illustrated in FIG. 17, memory 1734 may store computer-readable, computer-executable instructions 1732 (e.g., software codes) that are configured to, when executed, cause processor 1728 to perform various functions described herein, for example, with reference to FIGS. 1 through 17. Alternatively, instructions 1732 may not be directly executable by processor 1728 but be configured to cause node 1700 (e.g., when compiled and executed) to perform various functions described herein.

Processor 1728 may include an intelligent hardware device, for example, a central processing unit (CPU), a microcontroller, an ASIC, etc. Processor 1728 may include memory. Processor 1728 may process data 1730 and instructions 1732 received from memory 1734, and information through transceiver 1720, the baseband communications module, and/or the network communications module. Processor 1728 may also process information to be sent to transceiver 1720 for transmission through antenna 1736, to the network communications module for transmission to a core network.

One or more presentation components 1738 presents data indications to a person or other device. For example, one or more presentation components 1738 include a display device, speaker, printing component, vibrating component, etc.

From the above description, it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE), the method comprising:
   receiving a first configuration for configuring one or more physical uplink control channel (PUCCH) resources;
   receiving a second configuration for configuring a plurality of spatial relations, each spatial relation comprising a spatial parameter for uplink (UL) transmission and a parameter for UL power control;
   receiving a signal that indicates one of a first mode or a second mode;
   receiving downlink control information (DCI) indicating a PUCCH resource from the one or more PUCCH resources, wherein first and second spatial relations of the plurality of spatial relations are activated for the PUCCH resource;
   deriving a plurality of PUCCH transmission occasions associated with the indicated PUCCH resource;
   transmitting a same uplink control information (UCI) content on each of the plurality of PUCCH transmission occasions;
   when a total number of the plurality of PUCCH transmission occasions is larger than two and the signal indicates the first mode,
      applying the first spatial relation on (4*N+1)-th and (4*N+2)-th PUCCH transmission occasions among the plurality of PUCCH transmission occasions, wherein N is an integer equal to, or greater than, zero, and
      applying the second spatial relation on (4*N+3)-th and (4*N+4)-th PUCCH transmission occasions among the plurality of PUCCH transmission occasions; and
   when the total number of the plurality of PUCCH transmission occasions is equal to two, or when the total number of the plurality of PUCCH transmission occasions is larger than two and the signal indicates the second mode,
      applying the first spatial relation on (2*N+1)-th PUCCH transmission occasions among the plurality of PUCCH transmission occasions, and
      applying the second spatial relation on (2*N+2)-th PUCCH transmission occasions among the plurality of PUCCH transmission occasions.

2. The method of claim 1, wherein the signal comprises a Radio Resource Control (RRC) parameter.

3. The method of claim 1, wherein the DCI comprises a DCI scheduling downlink transmission.

4. The method of claim 1, wherein the first spatial relation and the second spatial relation are activated by a single MAC-CE.

5. The method of claim 1, wherein each of the first and second spatial relations is activated by a different MAC-CE.

6. The method of claim 1, wherein the plurality of PUCCH transmission occasions correspond to a plurality of time units.

7. The method of claim 6, wherein each time unit of the plurality of time units is one of a slot, a sub-slot, a mini-slot, or a number of symbols.

8. The method of claim 1, wherein receiving the first and second configurations comprises receiving the first and second configurations from at least one of first and second transmission reception points (TRPs).

9. The method of claim 1, wherein:
   the first configuration is associated with a first value of an index;
   the second configuration is associated with a second value of the index; and
   the index is associated with a Control Resource Set pool index (CORESETPoolIndex).

10. The method of claim 1, wherein each of the plurality of PUCCH transmission occasions is transmitted to one of first and second transmission reception points (TRPs).

11. A user equipment (UE), comprising:
   one or more non-transitory computer-readable media storing one or more computer-executable instructions; and at least one processor coupled to the one or more non-transitory computer-readable media, and configured to execute the one or more computer-executable instructions to:
- receive a first configuration for configuring one or more physical uplink control channel (PUCCH) resources;
- receive a second configuration for configuring a plurality of spatial relations, each spatial relation comprising a spatial parameter for uplink (UL) transmission and a parameter for UL power control;
- receive a signal that indicates one of a first mode or a second mode;
- receive downlink control information (DCI) indicating a PUCCH resource from the one or more PUCCH resources, wherein first and second spatial relations of the plurality of spatial relations are activated for the PUCCH resource;
- derive a plurality of PUCCH transmission occasions associated with the indicated PUCCH resource;
- transmit a same uplink control information (UCI) content on each of the plurality of PUCCH transmission occasions;

when a total number of the plurality of PUCCH transmission occasions is larger than two and the signal indicates the first mode, the at least one processor is further configured to execute the computer-executable instructions to:
- apply the first spatial relation on (4*N+1)-th and (4*N+2)-th PUCCH transmission occasions among the plurality of PUCCH transmission occasions, wherein N is an integer equal to, or greater than, zero, and
- apply the second spatial relation on (4*N+3)-th and (4*N+4)-th PUCCH transmission occasions among the plurality of PUCCH transmission occasions; and when the total number of the plurality of PUCCH transmission occasions is equal to two, or when the total number of the plurality of PUCCH transmission occasions is larger than two and the signal indicates the second mode, the at least one processor is further configured to execute the computer-executable instructions to:
- apply the first spatial relation on (2*N+1)-th PUCCH transmission occasions among the plurality of PUCCH transmission occasions, and
- apply the second spatial relation on (2*N+2)-th PUCCH transmission occasions among the plurality of PUCCH transmission occasions.

12. The UE of claim 11, wherein the signal comprises a Radio Resource Control (RRC) parameter.

13. The UE of claim 11, wherein the DCI comprises a DCI scheduling downlink transmission.

14. The UE of claim 11, wherein the first spatial relation and the second spatial relation are activated by a single MAC-CE.

15. The UE of claim 11, wherein each of the first and second spatial relations is activated by a different MAC-CE.

16. The UE of claim 11, wherein the plurality of PUCCH transmission occasions correspond to a plurality of time units.

17. The UE of claim 16, wherein each time unit of the plurality of time units is one of a slot, a sub-slot, a mini-slot, or a number of symbols.

18. The UE of claim 11, wherein the first and second configurations are received from at least one of first and second transmission reception points (TRPs).

19. The UE of claim 11, wherein:
- the first configuration is associated with a first value of an index;
- the second configuration is associated with a second value of the index; and
- the index is associated with a Control Resource Set pool index (CORESETPoolIndex).

20. The UE of claim 11, wherein each of the plurality of PUCCH transmission occasions is transmitted to one of first and second transmission reception points (TRPs).

* * * * *